United States Patent [19]

Uchida et al.

[11] Patent Number: 4,846,296

[45] Date of Patent: Jul. 11, 1989

[54] HYDRAULIC FLUID PRESSURE CONTROL SYSTEM FOR USE WITH POWER ASSIST STEERING

[75] Inventors: Koh Uchida, Sagamihara; Takashi Kurihara, Atsugi; Makoto Miyoshi, Kawasaki, all of Japan

[73] Assignee: Nissan Motor Co., Ltd., Yokohama, Japan

[21] Appl. No.: 151,122

[22] Filed: Feb. 1, 1988

[30] Foreign Application Priority Data

Jan. 30, 1987 [JP] Japan ................................ 62-19785
Jan. 30, 1987 [JP] Japan ................................ 62-19786

[51] Int. Cl.⁴ ............................................. B62D 5/08
[52] U.S. Cl. ................................ 180/140; 180/141; 180/142; 280/91
[58] Field of Search ............... 180/140, 141, 142, 143, 180/132, 146, 149; 280/91

[56] References Cited

U.S. PATENT DOCUMENTS

| | | | |
|---|---|---|---|
| 4,440,254 | 4/1984 | Shibahata et al. | 180/140 |
| 4,441,572 | 4/1984 | Ito et al. | 180/140 |
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 |
| 4,570,735 | 2/1986 | Duffy | 180/142 |
| 4,579,186 | 4/1986 | Uno et al. | 180/140 |
| 4,586,581 | 5/1986 | Shibahata et al. | 180/140 |
| 4,588,039 | 5/1986 | Uno et al. | 180/140 |
| 4,619,339 | 10/1986 | Futaba et al. | 180/143 |
| 4,632,204 | 12/1986 | Honaga et al. | 180/142 |
| 4,640,379 | 2/1987 | Shibahata et al. | 180/140 |
| 4,669,567 | 6/1987 | Nakamura et al. | 180/140 |
| 4,672,885 | 6/1987 | Kervagoret | 91/450 |

FOREIGN PATENT DOCUMENTS

| | | |
|---|---|---|
| 2568843 | 2/1986 | France . |
| 47-30039 | 11/1972 | Japan . |
| 54-15232 | 2/1979 | Japan . |
| 54-159921 | 12/1979 | Japan . |
| 56-38430 | 9/1981 | Japan . |
| 56-174363 | 12/1981 | Japan . |
| 57-30663 | 2/1982 | Japan . |
| 58-156459 | 9/1983 | Japan . |
| 60-85061 | 5/1985 | Japan . |
| 61-43229 | 9/1986 | Japan . |

Primary Examiner—Kenneth R. Rice
Attorney, Agent, or Firm—Foley & Lardner, Schwartz, Jeffery, Schwaab, Mack, Blumenthal & Evans

[57] ABSTRACT

A power steering control valve can activate not only a power assist steering system but also a rear wheel steering system. The control valve includes valve elements relatively displaceable in response to a steering input torque to define therebetween parallel first and second fluid flow paths between an oil pump and a fluid reservoir to produce a first pressure difference in a front power cylinder in response to the steering torque. The valve elements define therebetween variable flow orifice means for producing a second pressure difference in a rear wheel power cylinder in response to the steering torque. The control valve also includes an externally controlled variable flow orifice valve. This orifice valve is arranged with respect to the variable flow orifice means such that it increases fluid flow passing therethrough in response to a second predetermined variable, such as a vehicle speed, to decrease the second pressure difference in the rear wheel power cylinder.

21 Claims, 23 Drawing Sheets (6)

(4R, 4L)

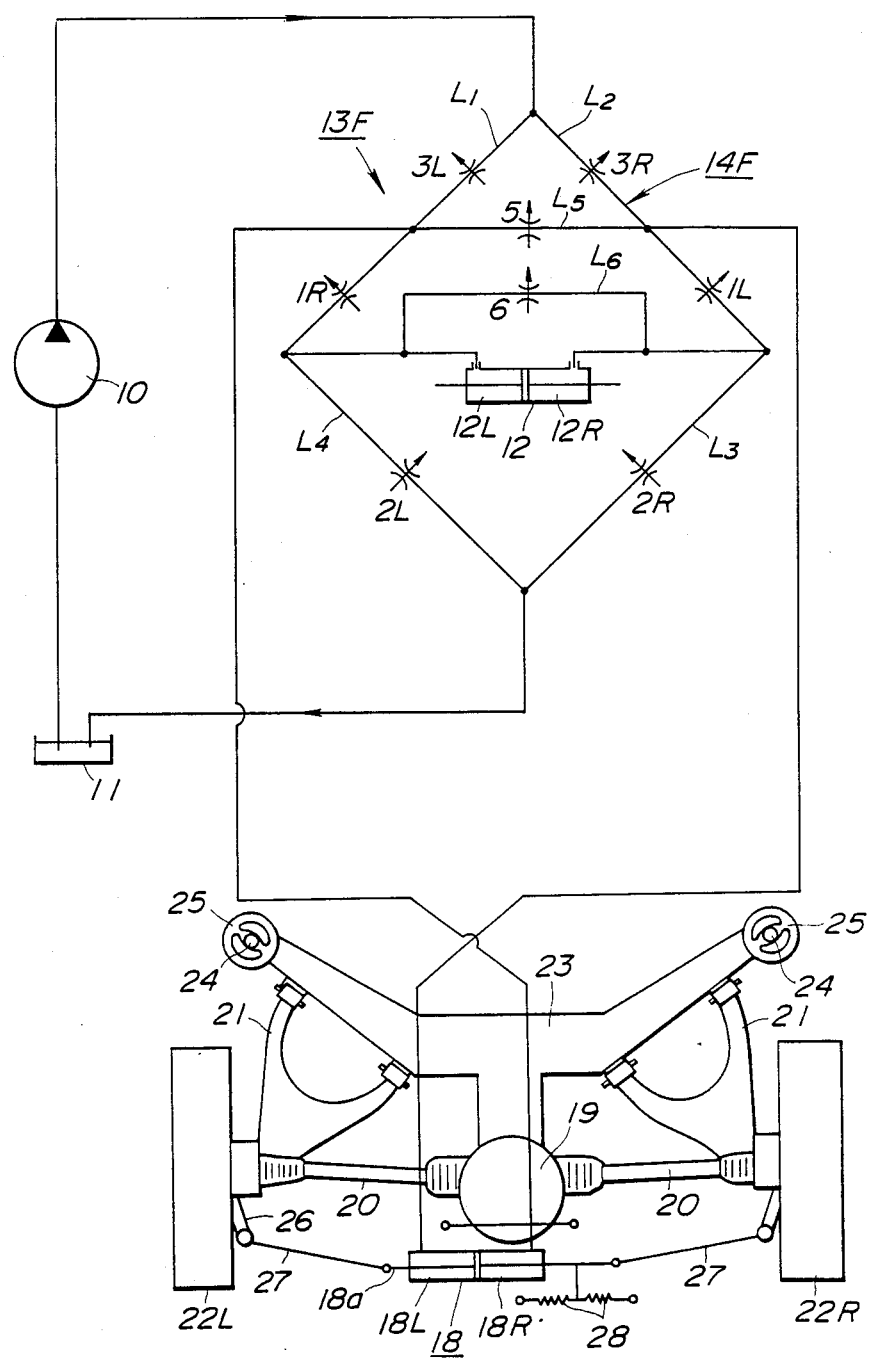

HYDRAULIC FLUID PRESSURE CONTROL SYSTEM FOR USE WITH POWER ASSIST STEERING

RELATED APPLICATIONS

The following two U.S. Patent Applications have been already filed and assigned to the same assignee of the present application.

(1) U.S. patent application Ser. No. 044,065, filed on Apr. 29, 1987, now pending.

(2) U.S. patent application Ser. No. 102,412, filed on Sept. 29, 1987, now pending.

The following five U.S. Patent Applications have been concurrently filed on Dec. 28, 1987 and assigned to the same assignee of the present application.

(3) U.S. patent application Ser. No. 07/138,480, filed on Dec. 28, 1987, claiming priority based on Japanese Patent Application No. 61-313519 with a filing date of Dec. 27, 1986.

(4) U.S. patent application Ser. No. 07/138,490, filed on Dec. 28, 1987, claiming priority based on Japanese Patent Application No. 61-313521 with a filing date of Dec. 27, 1986.

(5) U.S. patent application Ser. No. 07/138,479, filed on Dec. 28, 1987, claiming priority based on Japanese Patent Application No. 61-313518 with a filing date of Dec. 27, 1986.

(6) U.S. patent application Ser. No. 07/138,402, filed on Dec. 28, 1987, claiming priority based on Japanese Patent Application No. 61-313520 with a filing date of Dec. 27, 1986.

(7) U.S. patent application Ser. No. 07/138,345, filed on Dec. 28, 1987, claiming priority based on Japanese Patent Application No. 61-313517 with a filing date of Dec. 27, 1986.

The following three U.S. patent applications have been concurrently filed and assigned to the same assignee of the present application.

(8) U.S. patent application Ser. No. 07/151,127, filed on Feb. 1, 1988, claiming priority based on Japanese Patent Application No. 62-19787 with a filing date of Jan. 30, 1987.

(9) U.S. patent application Ser. No. 07/150,949, filed on Feb. 1, 1988, claiming priority based on Japanese Patent Application No. 62-19784 with a filing date of Jan. 30, 1987.

(10) U.S. patent application Ser. No. 07/151,121, filed on Feb. 1, 1988, claiming priority based on Japanese Patent Application No. 62-19783 with a filing date of Jan. 30, 1987.

BACKGROUND OF THE INVENTION

The present invention relates to a hydraulic fluid pressure control system for use with a power assist steering, and more particularly to a hydraulic fluid pressure control system of the above kind which can hydraulically activated not only a hydraulically operated device, i.e., a power cylinder, of a power assist steering for dirigible wheels of a vehicle, but also some other hydraulically operated device on the vehicle.

In automotive vehicles, a hydraulic fluid pressure control system which hydraulically activates not only a power cylinder of a power assist steering system for a pair of front dirigible wheels, but also a rear power cylinder in a rear suspension for varying the angle that a pair of rear wheels would otherwise assume during cornering so as to compensate for the so called "compliance steering effect" induced in the rear suspension. In one such system disclosed, for example, in U.S. Pat. No. 4,440,254 issued to Sibahata et al. (corresponding to German Patent Application No. P3172164.8), a compliance steer control system is responsive to pressurization of right and left cylinder chambers of a power cylinder of a front power steering system to produce a bias which tends to turn the pair of rear wheels in response to steering torque. This known system is advantageous in that, with a single power steering control valve, both the power assistance to the front dirigible wheels and the bias to turn the rear wheels are varied in response to steering torque applied to the control valve. However, with this known system, it is not possible to give different output vs., steering torque input characteristics which are required by the power assist steering and the compliance steer control, respectively steer control, respectively. Thus, in another improved system as disclosed in U.S. Pat. No. 4,586,581 issued to Shibahata et al. (corresponding to DE-OS 34 37 071), in addition to a pump, and a power steering control valve designed for use in a power assist steering for front dirigible wheels, a second pump and a second control valve are provided for a compliance steer control of rear wheels. In this known system, the discharge rate of hydraulic fluid from the first pump is high at low vehicle speeds to provide a high degree of power assistance, but is decreased to cause a reduction in the degree of power assistance. The setting of the second pump is different from the first pump such that the discharge rate of hydraulic fluid is very low or almost zero at low vehicle speeds, but increases up to the miaximum at high vehicle speeds. This known system requires two pumps, two control valves and two sets of pipings, thus posing the following problems, thus causing cost increase, making it difficult to install on the vehicle, and increasing burden beared by an engine driving these pumps.

An object of the present invention, therefore, is to provide a hydraulic fluid pressure control system of the above kind which, with a single control valve, two different hydraulic fluid pressure output variation characteristics are given versus a predetermined variavle, such as a steering torque.

SUMMARY OF THE INVENTION

In a hydraulic fluid pressure control system of the present invention, a control valve includes valve elements relatively displaceable in response to a predetermined variable, for example a steering torque, to define therebetween parallel first and second fluid flow paths connected between a fluid source and fluid reservoir to produce a first pressure difference in a first fluid pressure operated device, for example a power cylinder of a power assist steering for front dirigible wheels, in response to the first predetermined variable. According to the present invention, the valve elements define therebetween variable flow orifice means for producing a second pressure difference in a second hydraulic fluid pressure operated device, for example a rear power cylinder for a compliance steer control, in response to the first predetermined variable, and an externally controlled variable flow orifice valve is arranged with respect to the variable flow orifice means such that it increases fluid flow passing therethrough in response to a second predetermined variable, for example, a vehicle speed, to decrease the second pressure difference in the second hydraulic fluid pressure operated device.

BRIEF DESCRIPTION OF THE DRAWINGS

FIGS. 26 and 27 show embodiments;

DETAILED DESCRIPTION OF THE INVENTION

Figure 1:
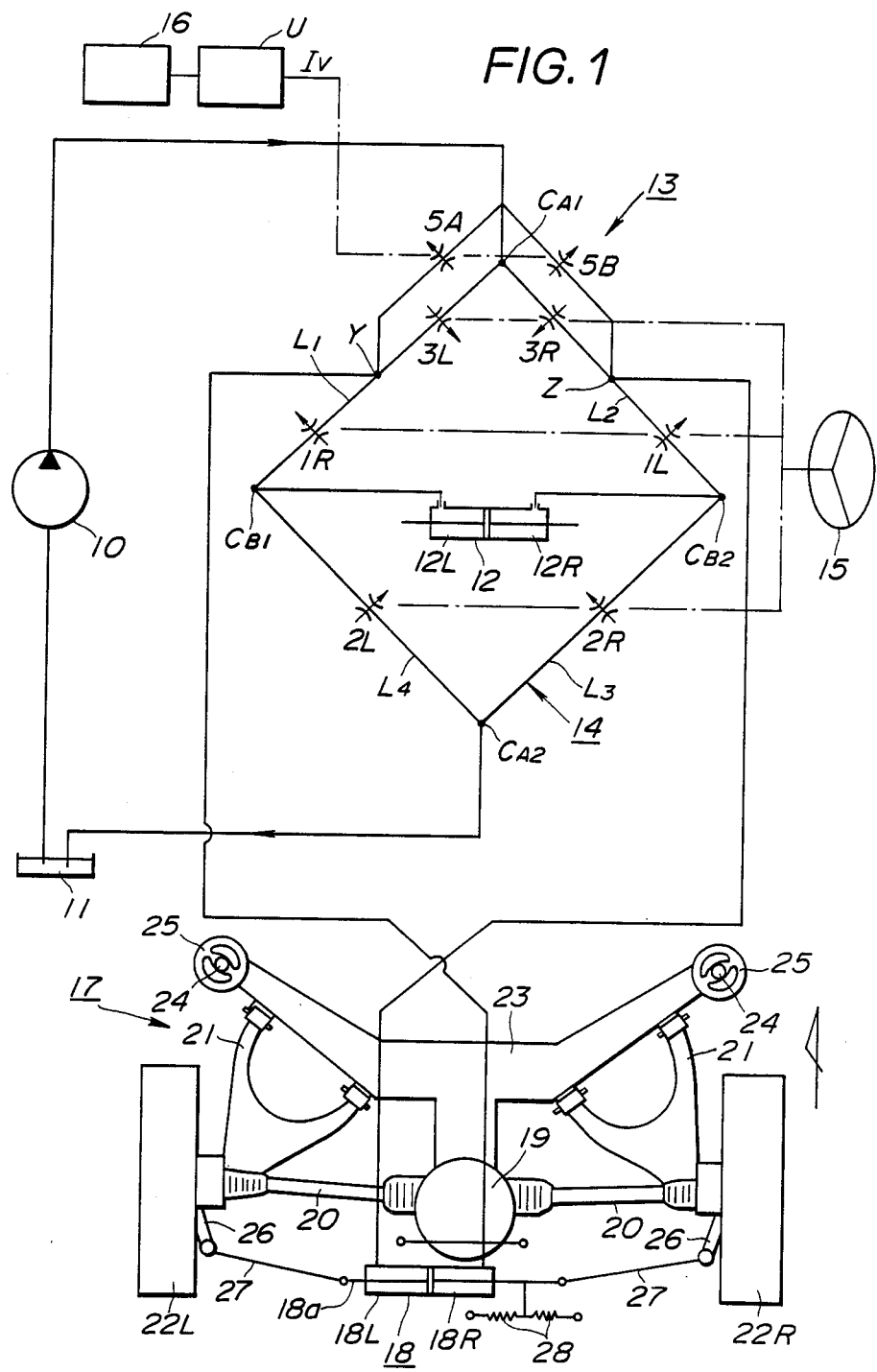
FIG. 1 is a circuit diagram of a hydraulic fluid pressure control system in association with a front power cylinder of a power assist steering system for a pair of dirigible front wheels of a vehicle and a rear power cylinder for a pair of rear wheels of the vehicle.

Referring to FIG. 1, a hydraulic fluid pressure control system is shown in operative connection with a front power cylinder 12, as a first hydraulic fluid pressure operated device, of a power assist steering system for a pair of front dirigible wheels and a rear power cylinder, as a second hydraulic fluid pressure operated device, of a rear wheel steering steering system 17.

The control system includes an oil pump 10, as a hydraulic fluid source, a tank 11, as a fluid reservoir, and a power steering control valve 13 employing a fluid flow distributor circuit 14 of the open center type. Also shown are a steering wheel 15, a vehicle speed sensor 16 and a control unit U.

In the conventional manner, the fluid flow distributor circuit 14 includes two parallel fluid flow paths, namely, a first fluid flow path $L_1$-$L_4$ and a second fluid flow path $L_2$-$L_3$, connected between a pump fluid supply port $C_{A1}$ and a fluid return port $C_{A2}$. The first fluid flow path $L_1$-$L_4$ has a cylinder connection port $C_{B1}$ connected to a left turn cylinder chamber 12L of the front power cylinder 12, while the second fluid flow path $L_2$-$L_3$ has a cylinder connection portion $C_{B2}$ connected to a right turn cylinder chamber 12R of the power cylinder 12. Thus, the first fluid flow path may be divided into an upstream flow path section $L_1$ and a downstream flow path section $L_4$ with regard to the cylinder connection port $C_{B1}$. Similarly, the second fluid flow path may be divided into an upstream flow path section $L_2$ and a downstream flow path section $L_3$ with regard to the cylinder connection portion $C_{B2}$.

Figure 2:
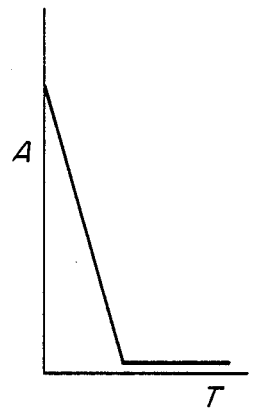
FIG. 2 shows a first pattern in which an orifice flow area (A) of a variable flow orifice decreases as a steering torque (T) increases.
Figure 3:
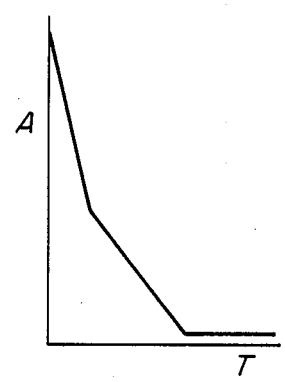
FIG. 3 shows a second pattern in which an orifice flow area (A) of a variable flow orifice decreases as steering torque (T) increases.

The first fluid flow path $L_1$-$L_4$ includes an inflow control variable flow orifice 1R of the first kind which has an orifice area decreasing as input torque T increases when the steering wheel 15 is turned clockwise from a central rest position so as to restrict fluid flow into the left turn cylinder chamber 12L of the power cylinder 12, and an outflow control variable flow orifice 2L of the second kind which has an orifice area decreasing as the input torque T increases when the steering wheel 15 is turned counterclockwise from the central rest position so as to restrict fluid flow out of the left turn cylinder chamber 12L of the power cylinder 12. The second fluid flow path $L_2$-$L_3$ inches an inflow control variable flow orifice 1L of the second kind which has an orifice area decreasing as the steering torque T increases when the steering wheel 15 is turned counterclockwise from the central rest position so as to restrict fluid flow into the right turn cylinder chamber 12R of the power cylinder 12, and an outflow control variable flow orifice 2R of the second kind which has an orifice area decreasing as the steering torque T increases when the steering wheel 15 is turned clockwise from the central rest position so as to restrict fluid flow out of the right turn cylinder chamber 12R of the power cylinder 12. The orifice area of the inflow control variable flow orifice 1R of the first kind decreases in the first pattern as shown in FIG. 2 during clockwise turning of the steering wheel 15, while the orifice area of the outflow control variable flow orifice 2R of the first kind decreases in the second pattern as shown in FIG. 3 during clockwise turning of the steering wheel 15. The orifice area of the inflow control variable flow orifice 1L of the second kind decreases in the first pattern as shown in FIG. 2 during counterclockwise turning of the steering wheel 15, while the orifice area of the outflow control variable flow orifice 2L of the second kind decreases in the second pattern as shown in FIG. 3 during counterclockwise turning of the steering wheel 15.

Figure 4:
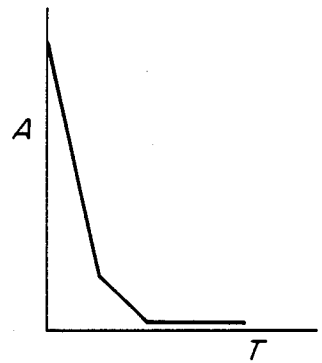
FIG. 4 is a third pattern in which an orifice flow area (A) of a variable flow orifice decreases as steering torque (T) increases.
Figure 5:
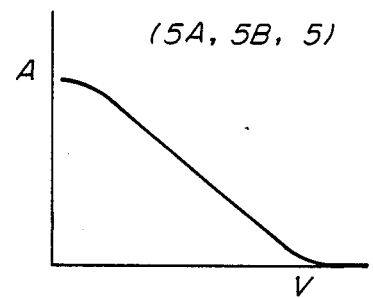
FIG. 5 is a first pattern in which an orifice area (A) of one or each externally controlled variable flow orifice varies as vehicle speed (V) varies.
Figure 6:
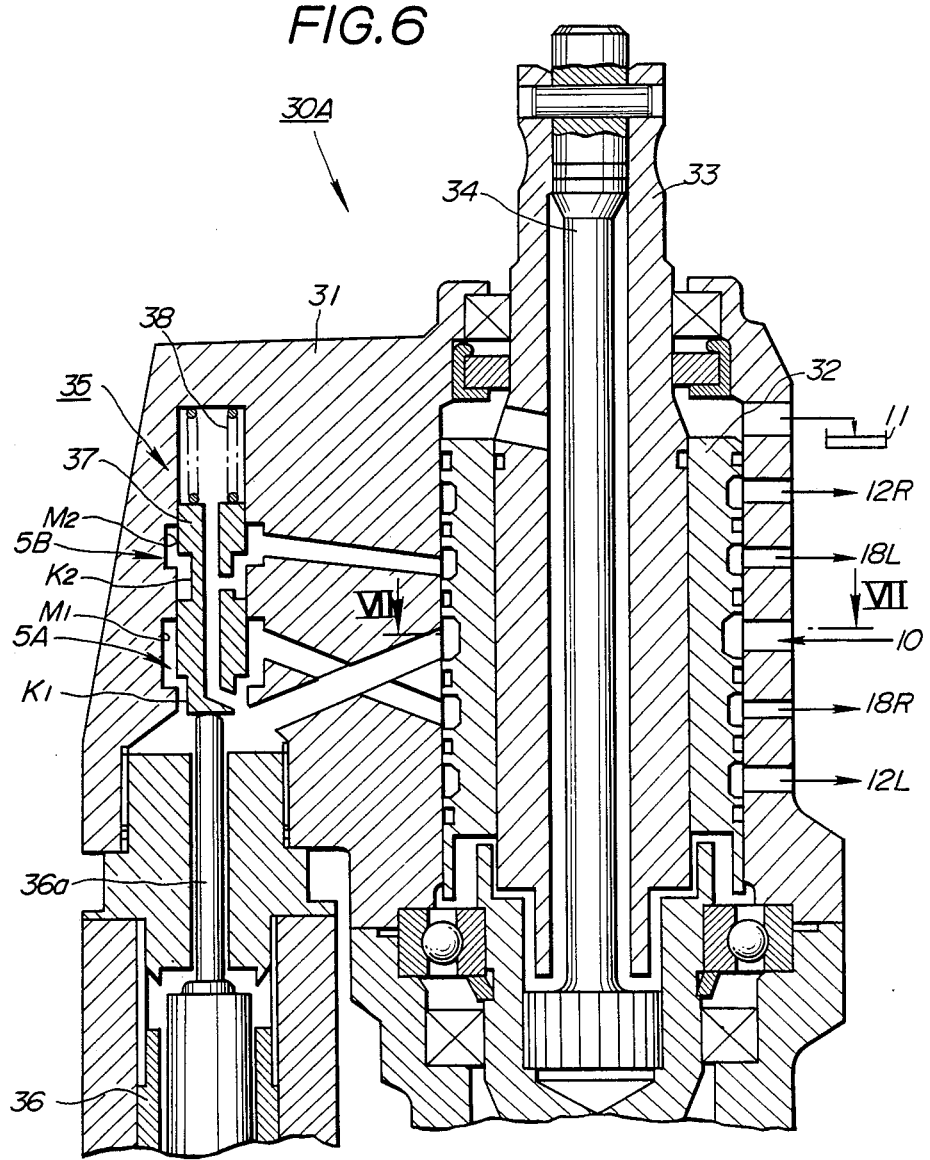
FIG. 6 is a fragmentary sectional diagram of a rotary type control valve employing a fluid distributor circuit shown in FIG. 1.

In order to produce a second pressure difference in the rear power cylinder 18, variable flow orifice means 3R, 3L are defined and include a first auxiliary variable flow orifice 3R of the first kind which has an orifice area decreasing as steering torque increases when the steering 15 is turned clockwise from the central rest position, and a second auxiliary variable flow orifice 3L of the second kind which has an orifice area decreasing as steering torque T increases when the steering wheel 15 is turned counterclockwise from the central rest position. The first auxiliary variable flow orifice 3R is arranged in the second fluid flow path $L_2$-$L_3$ at the upstream section $L_2$ thereof and in series with the inflow control variable flow orifice 1L. The second auxiliary variable flow orifice 3L is arranged in the first fluid flow path $L_1$-$L_4$ at the upstream section $L_1$ and in series with the inflow control variable flow orifice 1R. Specifically, the first and second auxiliary variable flow orifices 3R and 3L are disposed upstream of the inflow control variable flow orifices 1L and 1R, respectively. The orifice area of the first auxiliary variable flow orifice 3R decreases in the third pattern as shown in FIG. 4 during clockwise turning of the steering wheel 15, while the orifice area of the second auxiliary variable flow orifice 3L decreases in the third pattern as shown in FIG. 4 during counterclockwise turning of the steering wheel 15. The control valve 13 also includes an externally controlled variable flow orifice valve which defines a first externally controlled variable flow orifice 5A arranged in parallel to the second auxiliary variable flow orifice 3L and a second externally controlled variable flow orifice 5B arranged in parallel to the first auxiliary variable flow orifice 3R. These externally controlled variable flow orifices 5A and 5B are controlled by the control unit U in response to a vehicle speed V detected by the vehicle speed sensor 16. The control unit U regulates electric current IV supplied to a solenoid actuator for the externally controlled variable orifices 5A and 5B in response to the output of the vehicle speed sensor 16. The orifice area of the externally controlled variable flow orifices 5A and 5B is maximum at zero or near zero vehicle speeds and varies in inverse proportional to vehicle speed V in the pattern as shown in FIG. 5. Thus, the externally controlled variable flow orifices 5A and 5B are fully closed at high vehicle speeds.

The first fluid flow path $L_1$-$L_4$ includes a first predetermined portion Y connected to a right turn cylinder chamber 18R of the rear power cylinder 18. The first predetermined portion Y is disposed downstream of the second auxiliary variable flow orifice 3L and first externally controlled variable flow orifice 5A, but upstream of the inflow control variable flow orifice 1R of the first kind. The second fluid flow path $L_2$-$L_3$ includes a second predetermined portion Z connected to a left turn cylinder chamber 18L of the rear power cylinder 18. The second predetermined portion Z is disposed downstream of the first auxiliary variable flow orifice 3R and second externally controlled variable flow orifice 5B, but upstream of the inflow control variable flow orifice 1L of the second kind.

The rear power cylinder 18 includes a piston rod 18a which has one end operatively connected to a knuckle arm 26 of a rear left steering wheel 22L via a rod 27 and an opposite end operatively connected to a knuckle arm 26 of a right rear wheel 22R via a rod 27. In order to keep the rear wheels 22L and 22R in their neutral position, return springs or rubber bushings 28 are provided. The rear wheels 22L and 22R are suspended via semi-trailing arms 21 to a rear wheel support member 23 which is in turn mounted to a vehicle body, not shown, via pins 24 and rubber insulators 25 in the conventional manner. Designated by the reference numeral 19 is a differential gearing which has axles 20 extending to the rear wheels 22L and 22R in the conventional manner.

Figure 7:
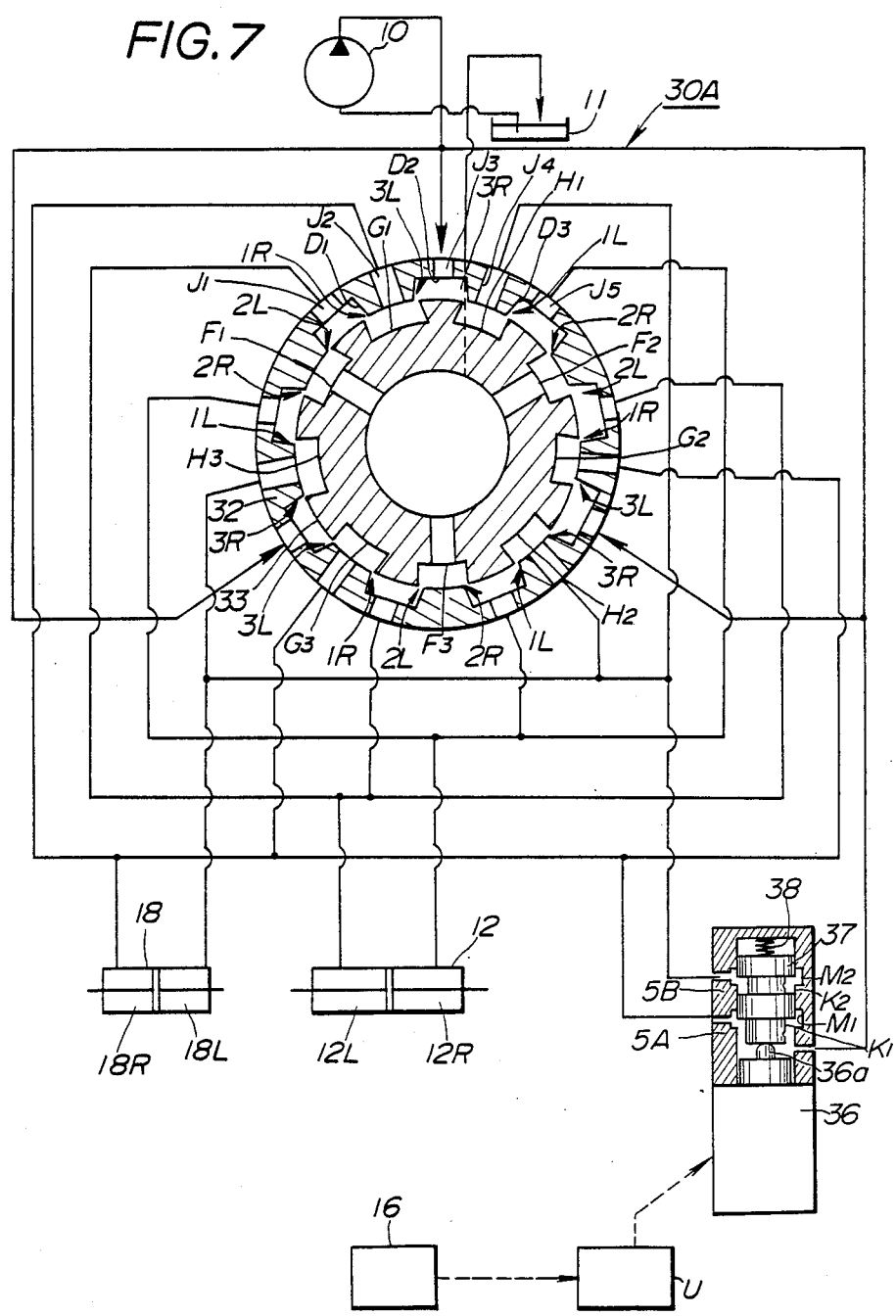
FIG. 7 is a circuit diagram including a section taken along the line VII—VII in FIG. 6.
Figure 8:
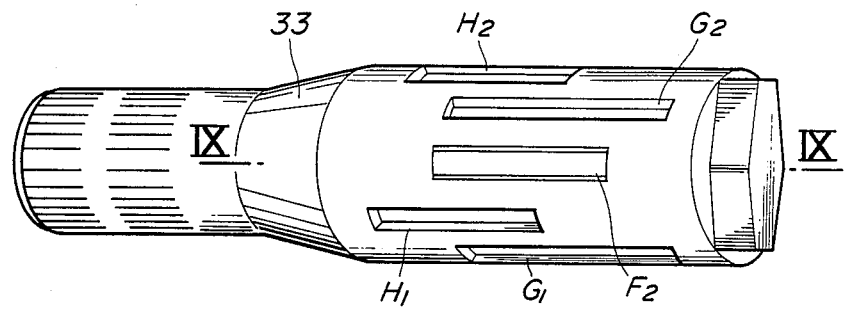
FIG. 8 is a perspective view of an inner valve of the control valve shown in FIG. 6.
Figure 9:
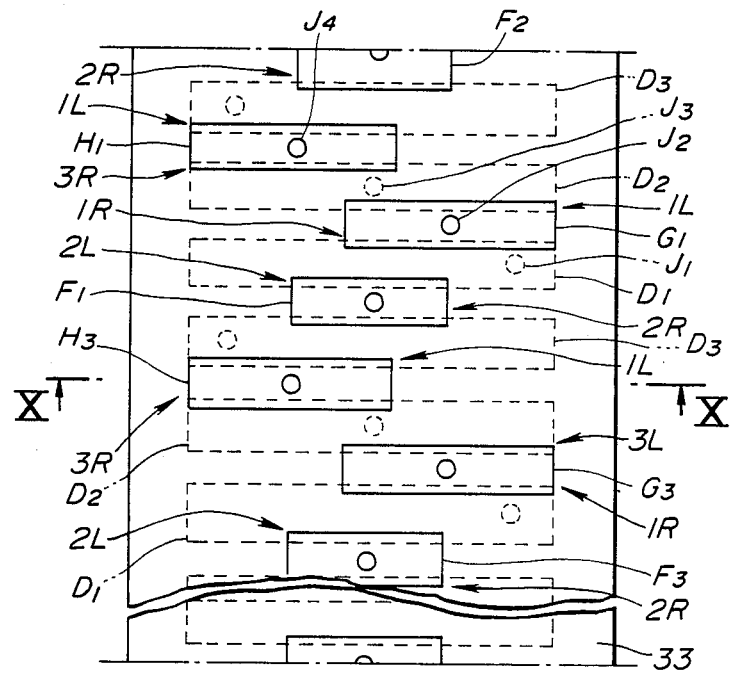
FIG. 9 is a diagram developed according to a longitudinal section IX—IX in FIG. 8.
Figure 10:
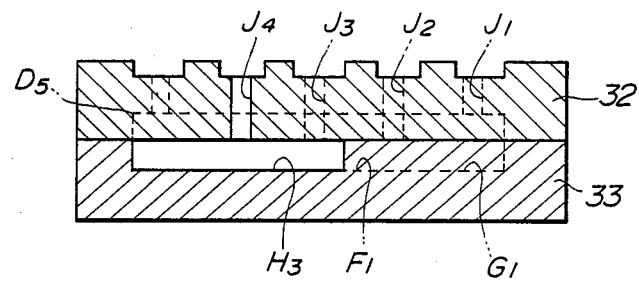
FIG. 10 is a section along the line X—X in FIG. 9.

Referring to FIGS. 6-10, particularly to FIG. 7, it is now explained how the fluid flow distributor circuit 14 shown in FIG. 1 is defined between two relatively displaceable valve elements, namely, a valve sleeve 32 and an inner valve 33, of a rotary type control valve 30A of the conventional type including a torsion bar 34.

As will be understood from FIG. 7, formed in the cylindrical inner wall of the valve sleeve 32 are nine longitudinally extending blind ended grooves, only three of them being designated by reference numerals $D_1$, $D_2$ and $D_3$, which are angularly separated by lands. Formed in the outer peripheral wall of the inner valve 33 are nine grooves $F_1$, $G_1$, $H_1$, $F_2$, $G_2$, $H_2$, $F_3$, $G_3$ and $H_3$. Each of these grooves lies opposite one land separating the adjacent two inner grooves of the valve sleeve 32.

It is now explained how the variable flow orifices 1R, 1L, 2R, 2L, 3R and 3L are formed during relative displacement of the inner valve 33 with regard to the valve sleeve 32. In this case three sets of such variable orifices are formed. Taking one set of them as an example, the inflow control variable flow orifice 1R is formed between the mating edges of the grooves $G_1$ and $D_1$, the outflow control variable flow orifice 2L is formed between the mating edges of the grooves $F_1$ and $D_1$, and the second auxiliary variable flow orifices 3L is formed between the mating edges of the grooves $G_1$ and $D_2$. The inflow control variable flow orifice 1L is formed between the mating edges of the grooves $H_1$ and $D_3$, the outflow control valve 2R is formed between the mating edges of the grooves $F_2$ and $D_3$, and the first auxiliary variable flow orifice 3R is formed between the mating edges of the grooves $H_1$ and $D_2$. Five ports $J_1$, $J_2$, $J_3$, $J_4$ and $J_5$ are formed for connection to the left turn cylinder chamber 12L of the front power cylinder 12, the right turn cylinder chamber 18R of the rear power cylinder 18, the pump 10, the left turn cylinder chamber 18L of the rear power cylinder 18, and the right turn cylinder chamber 12R of the front power cylinder 12. The arrangement of the grooves $F_1$-$F_3$, $G_1$-$G_3$, $H_1$-$H_3$ formed on the outer peripheral wall of the valve sleeve are readily understood from FIGS. 8, 9 and 10. The grooves $F_1$-$F_3$, $G_1$-$G_3$, and $H_1$-$H_3$ are axially displaced one after another for ease of drilling holes $F_1$ to $F_5$ through the valve sleeve 32.

Referring back to FIG. 6, the rotary control valve 30A has an externally controlled variable flow orifice valve 35 formed in a valve housing 31. This valve 35 defines first and second variable flow orifices 5A and 5B. It includes a spool 37 in abutting engagement with a plunger 36a of a solenoid actuator 36 under the bias of a return spring 38. This spool 37 is formed with grooves $K_1$ and $K_2$ which cooperate with inner grooves $M_1$ and $M_2$ formed in the bore in which the spool 37 is slidably disposed. The groove $K_1$ and the inner groove $M_1$ cooperate with each other to form the first externally controlled variable flow orifice 5A, while the groove $K_2$ and the inner groove $M_2$ cooperate with each other to form the second externally controlled variable flow orifice 5B.

Figure 11:
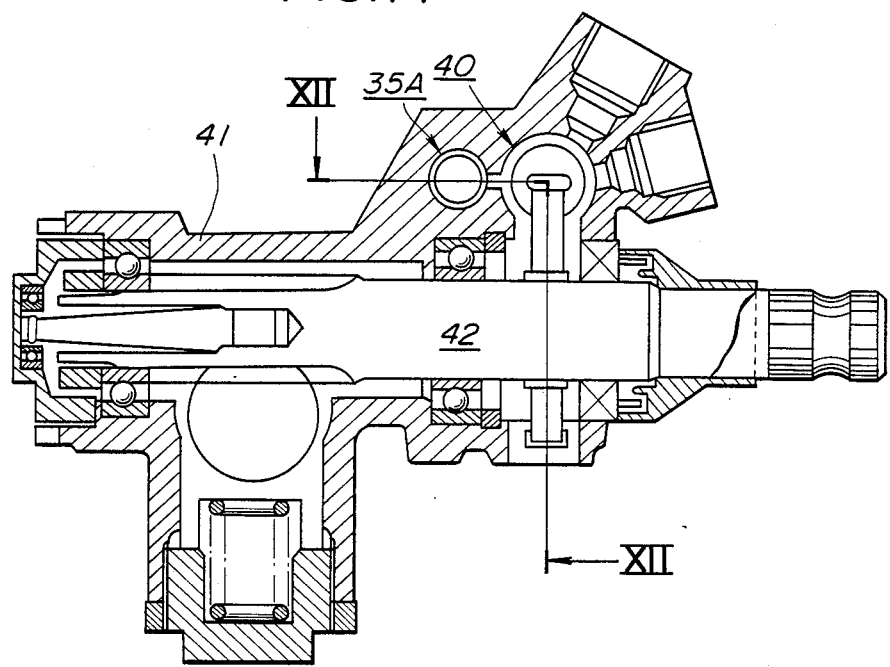
FIG. 11 is a sectional diagram of a spool type control valve employing a fluid distributor circuit shown in FIG. 1.
Figure 12:
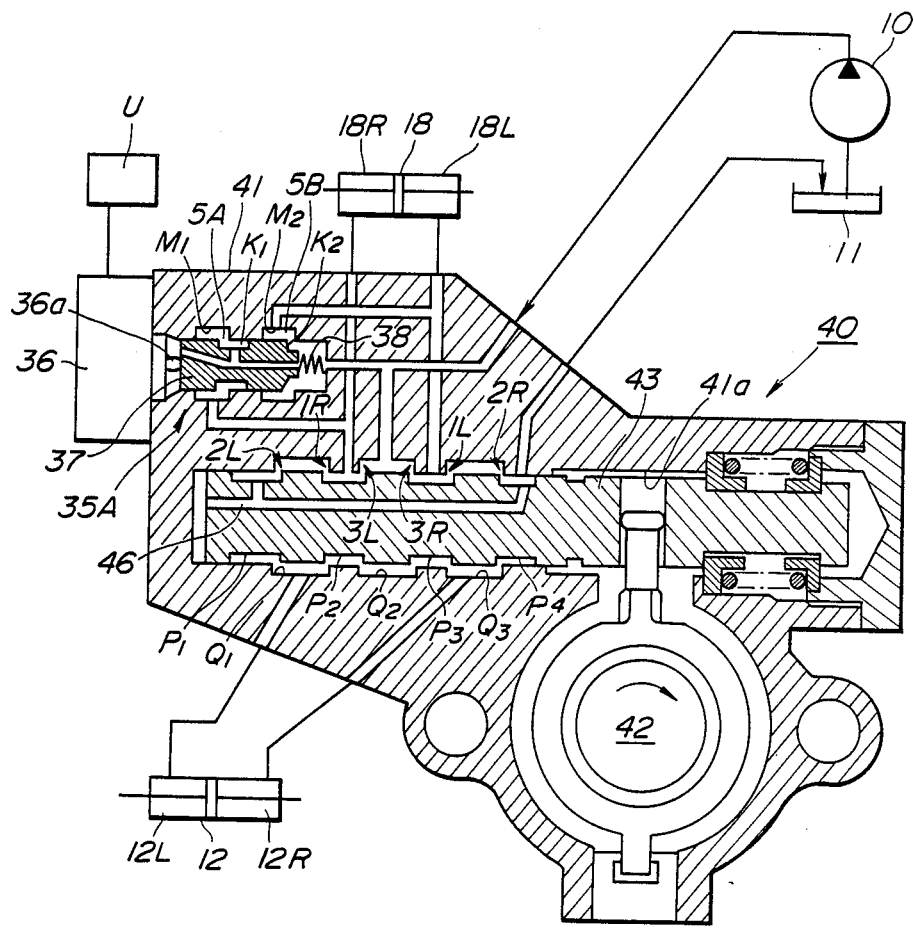
FIG. 12 is a section along the line XII—XII of FIG. 11.

Referring to FIGS. 11 and 12, it is now explained how the fluid flow distributor circuit 14 shown in FIG. 1 is defined between two relatively displaceable valve elements, namely, a spool 43 and a spool receiving bore 41a formed in a valve housing 41, of a spool type control 40. The spool 43 is axially displaceable relative to the bore 41a to the right as viewed in FIG. 12 in response to clockwise rotation of a pinion shaft 42, but it is displaceable to the left in response to counterclockwise rotation of the pinion shaft 42. The inner wall of the bore 41a is formed with three inner grooves $Q_1$, $Q_2$ and $Q_3$ which are axially separated by lands. The outer peripheral wall of the spool 43 is formed with four circumferential grooves $P_1$, $P_2$, $P_3$ and $P_4$. The inflow control variable orifice 1R is formed between the mating edges of the grooves $P_2$ and $Q_1$, the outflow control variable flow orifice 2L is formed between the mating edges of the grooves $P_1$ and $Q_1$ and the auxiliary variable flow orifice 3L is formed between the mating edges of the grooves $P_2$ and $Q_2$. The inflow control variable flow orifice 1L is formed between the mating edges of the grooves $P_3$ and $Q_3$, the outflow control variable flow orifice 2R is formed between the mating edges of the grooves $P_4$ and $Q_3$, and the auxiliary variable flow orifice 3R is formed between the mating edges of the grooves $P_3$ and $Q_2$.

The groove $Q_2$ is connected to the oil pump 10, the grooves $P_1$ and $P_4$ are connected to each other via an axial passage 46 formed through the spool 43 and they are connected to the reservoir 11. The grooves $P_2$ and $P_3$ are connected to right turn and left turn cylinder chambers 18R and 18L of the rear cylinder 18, respectively. The grooves $Q_1$ and $Q_3$ are connected to the left turn and right turn cylinder chambers 12L and 12R of the front power cylinder 12.

The spool type control valve 40 includes an externally controlled variable flow orifice valve 35A which is substantially the same as the previously described externally controlled variable flow orifice valve 35. The same reference numerals as used previously are again used to designate similar parts and portions. Thus, detailed description is hereby omitted.

Referring again to FIG. 1, the operation of the fluid flow distributor circuit 14 is explained. Assume that the vehicle is at a standstill and the steering wheel 15 is in the central rest position. Under these circumstances, all of the variable flow orifices 3L, 1R and 2L disposed in the first fluid flow path $L_1$-$L_4$ are opened to allow unrestricted fluid flow, and all of the variable flow orifices 3R, 1L and 2R of the second fluid flow path $L_2$-$L_3$ are opened to allow unrestricted fluid flow. Besides, the externally controlled variable flow orifices 5A and 5B are opened to allow unrestricted fluid flow since the vehicle speed V detected by the vehicle speed sensor 16 is zero. Under these conditions the fluid under pressure from the pump 10 is divided evenly through the first fluid path $L_1$-$L_4$ in one direction and through the second fluid flow path $L_2$-$L_3$ in the opposite direction. Thus, there occurs no pressure acting on the front power cylinder 12 and the rear power cylinder 18.

In the central rest position of the steering wheel 15, let us assume that the externally controlled variable flow orifices 5A and 5B are fully closed in response to a high vehicle speed, thus preventing fluid flow bypassing the auxiliary orifices 3R and 3L. Under these conditions, the fluid under pressure from the pump 10 is divided evenly through the first fluid flow path $L_1$-$L_4$ in one direction and through the second fluid flow path $L_2$-$L_3$ in the opposite direction. Thus, no pressure acts on the front power cylinder 12 and the rear power cylinder 18.

Figure 13:
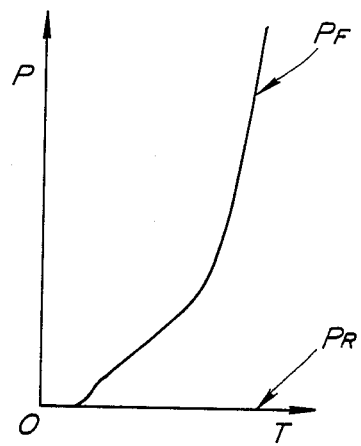
FIG. 13 shows a curve $P_F$ illustrating how a first pressure difference appied to a front power cylinder varies versus steering torque (T) at zero vehicle speed.

In turning the steering wheel 15 clockwise from the central rest position at zero vehicle speed, the inflow control variable flow orifice 1R decreases its flow area in response to steering torque T in the first pattern as shown in FIG. 2, the outflow control variable flow orifice 2R decreases its flow area in response to steering torque T in the second pattern as shown in FIG. 3, and the auxiliary variable flow orifice 3R decreases its flow area in response to steering torque T in the third pattern as shown in FIG. 4, even though the variable flow orifices 1L, 2L and 3L are opened, and the externally controlled variable flow orifices 5A and 5B are fully opened. Under this condition, since there is sufficient fluid flow through the externally controlled variable flow orifice 5B bypassing the auxilliary variable flow orifice 3R, the variable flow orifice 1R and 2R only effect a throttling of the fluid path inducing a pressure drop which in turn results in a pressure increase in the right turn cylinder chamber 12R of the front power cylinder 12 and in the both cylinder chambers 18R and 18L of the rear power cylinder 18. The variable flow orifice 2L is open and thus the left turn cylinder pressure chamber 12L of the front power cylinder 12 is in substantially direct communication with the reservoir 11. Thus, there is created pressure difference $P_F$ between the right turn cylinder chamber 12R and the left turn cylinder chamber 12L, causing the rod of the power cylinder to displace toward the left as viewed in FIG. 1. Since the same pressure as applied to the right turn cylinder chamber 12R is supplied to the right turn and left turn cylinder chambers 18R and 18L of the rear cylinder 18, there occurs substantially no pressure difference. Thus, the pressure difference $P_R$ in the rear power cylinder is substantially zero. As shown in FIG. 13, the pressure difference $P_F$ varies in proportion to steering torque T in a variation pattern which reflects the second pattern as shown in FIG. 3 since the inflow control variable orifice 1R is substantially closed at small steering torque as shown in FIG. 2. The pressure difference $P_R$ is substantially zero regardless of the variation of steering torque T. Thus, the power assist to the front steering linkage increases as shown by the curve $P_F$ in FIG. 13.

Figure 14:
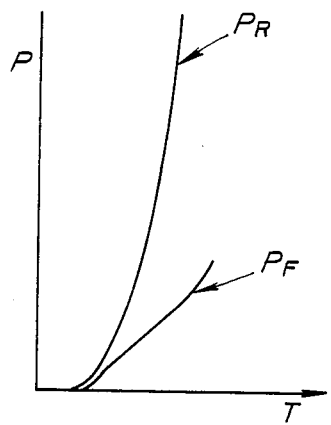
FIG. 14 shows a curve $P_R$ illustrating how a second pressure difference applied to a rear power cylinder varies versus steering torque (T) at high vehicle speeds in comparison with the curve $P_F$.

Now consider how the fluid flow distributor circuit 14 works at high vehicle speed when the externally controlled variable flow orifices 5A and 5B are fully closed. In turning the steering wheel 15 clockwise, the outflow control variable flow orifice 2L opens and thus the left turn cylinder chamber 12L is in substantially direct communication with the reservoir 11. The inflow control variable flow orifice 1R and the auxiliary variable flow orifice 3R effect a throttling of the fluid path, inducing a pressure drop which in turn results in a pressure increase in the right turn cylinder chamber 18R of the rear power cylinder. The outflow control orifice 2R effects a throttling of the fluid path, inducing a pressure drop which results in a pressure increase in the right turn cylinder chamber 12R of the power cylinder 12 and the left turn cylinder chamber 18L of the rear power cylinder 18. With the same steering torque, this pressure increase in the right turn cylinder chamber 12R of the front power cylinder 12 is less than the increase created at zero vehicle speed due to the effect of the pressure drop induced by the throttling effected by the auxiliary variable flow orifice 3R. Besides, since the auxiliary variable flow orifice 3R is substantially closed at a relatively small steering torque as compared to the outflow control variable flow orifice 2R is closed (see FIGS. 4 and 3), the power assist produced by the power cylinder 12 is limited and not great as will be understood from the cruve $P_F$ in FIG. 14. On the contrary, the pressure increase in the right turn cylinder chamber 18R varies in a pattern reflecting the third pattern shown in FIG. 4 in response to steering torque T. Since the pressure increase in the left turn cylinder chamber 18L of the rear power cylinder 18 is small and limited, the pressure difference $P_R$ in the rear power cylinder $P_R$ increases rapidly as the steering torque T increases as shown in FIG. 14, causing the rod 18a to displace to the left as viewed in FIG. 1, turning the rear wheels 22L and 22R to the right.

Figure 15:
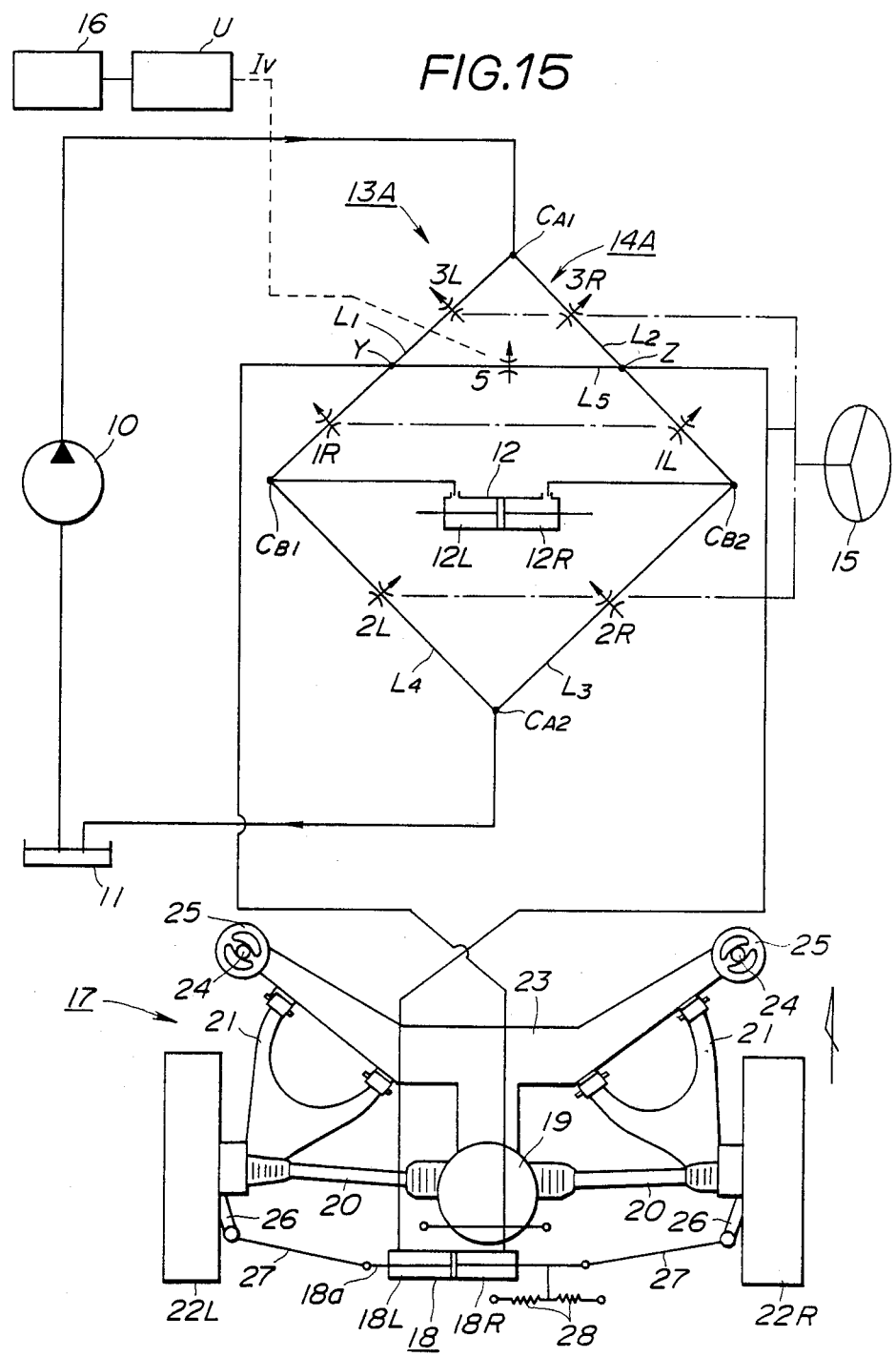
FIG. 15 is a similar view of FIG. 1 illustrating an improved version of that shown in FIG. 1 in that, instead of two externally controlled variable flow orifices, a single externally controlled variable flow orifice is used.

Referring to FIG. 15, another embodiment employing a modified control valve 13A is described. This embodiment is substantially the same as the first embodiment shown in FIG. 1 except the use of the modified control valve 13A instead of the control valve 13. The modified control valve 13A includes an externally controlled variable flow orifice valve which defines an externally controlled variable flow orifice 5. The externally controlled variable flow orifice 5 is disposed in a bypass path $L_5$ having one end connected to a first fluid path $L_1$-$L_4$ at a first predetermined portion Y and an opposite end connected to a second fluid flow path $L_2$-$L_3$ at a second predetermined portion Z. The externally controlled variable flow orifice 5 has an orifice flow area varying in response to vehicle speed V in the pattern as illustrated in FIG. 5.

Figure 16:
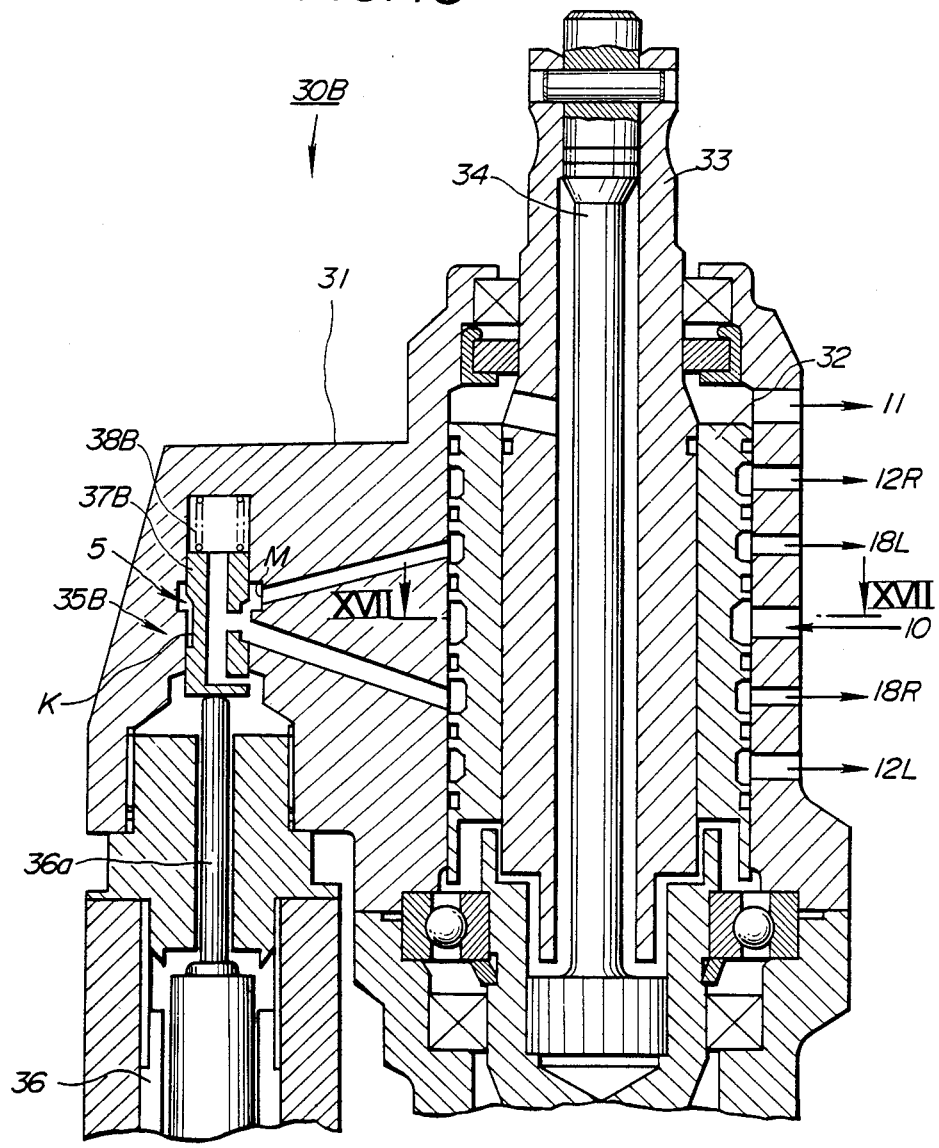
FIG. 16 is a similar view to FIG. 6 illustrating a rotary type control valve employing a fluid distributor circuit shown in FIG. 15.
Figure 17:
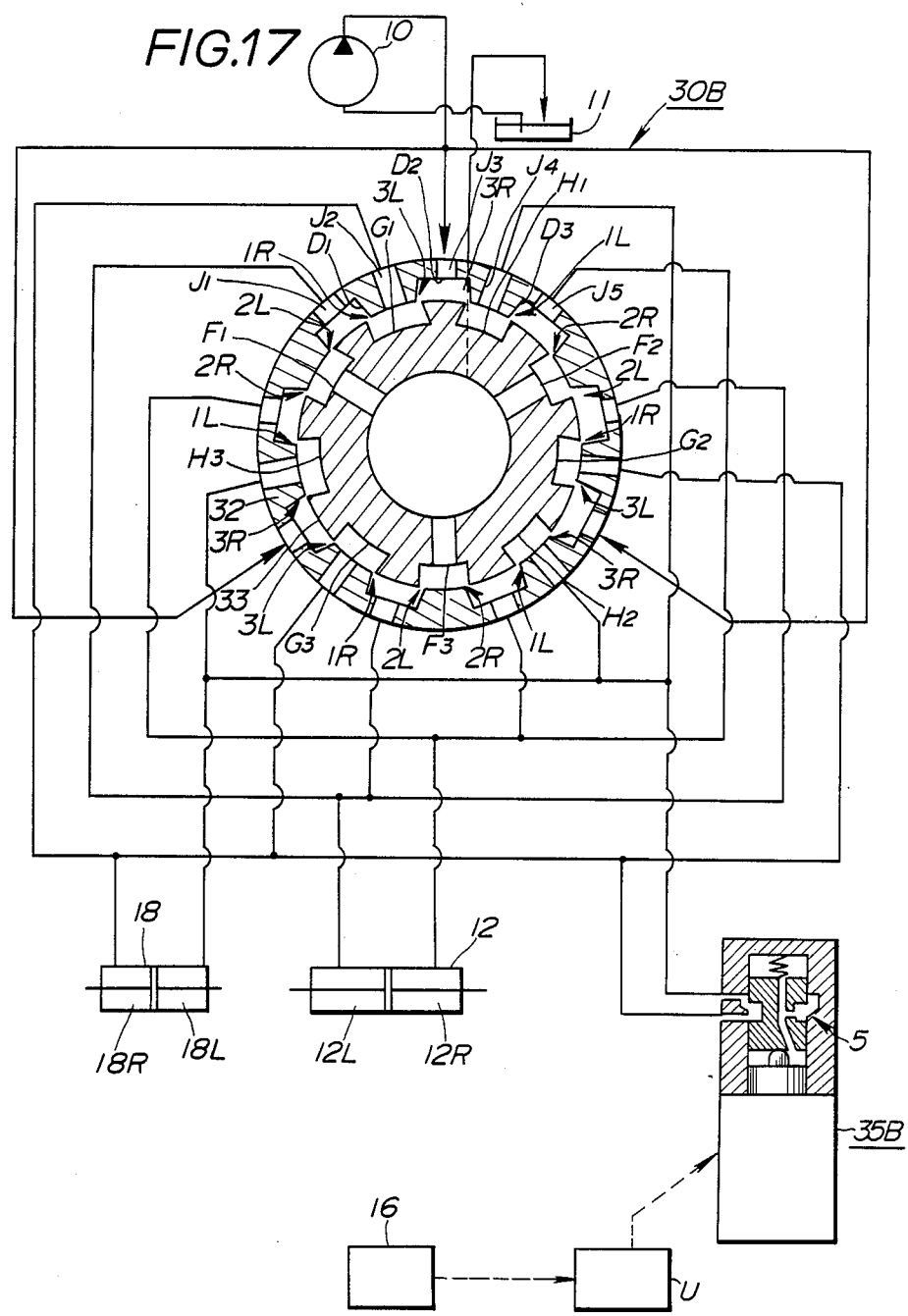
FIG. 17 is a circuit diagram including a section taken along the line XVII—XVII in FIG. 16.

A fluid flow distributor circuit 14A shown in FIG. 15 is defined between two relatively displaceable valve elements, namely, a valve sleeve 32 and an inner valve 33, of a rotary type control valve 30B shown in FIGS. 16 and 17. The rotary type control valve 30B is substantially the same as the rotary type control valve 30A shown in FIG. 6 except the provision of the externally controlled variable flow orifice valve 35B in the place of the externally controlled variable flow orifice valve 35.

Referring particularly to FIG. 16, the externally controlled variable flow orifice valve 35B includes a spool 37B formed with a circumferential groove K cooperating with an inner groove M formed in the spool receiving bore formed in a valve housing 31. The grooves K and M cooperate with each other to define the variable flow orifice 5. The spool 37B is subjected to bias of a return spring 38B and thus in abutting engagement with a plunger 36a of a solenoid 36.

Figure 18:
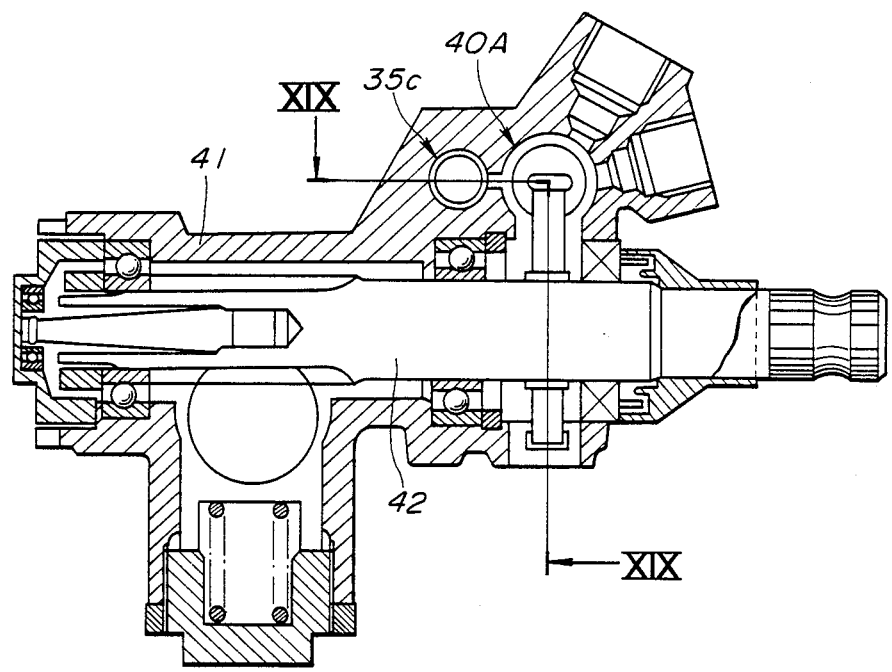
FIG. 18 is a sectional diagram of a spool type control valve employing a fluid distributor circuit shown in FIG. 15.
Figure 19:
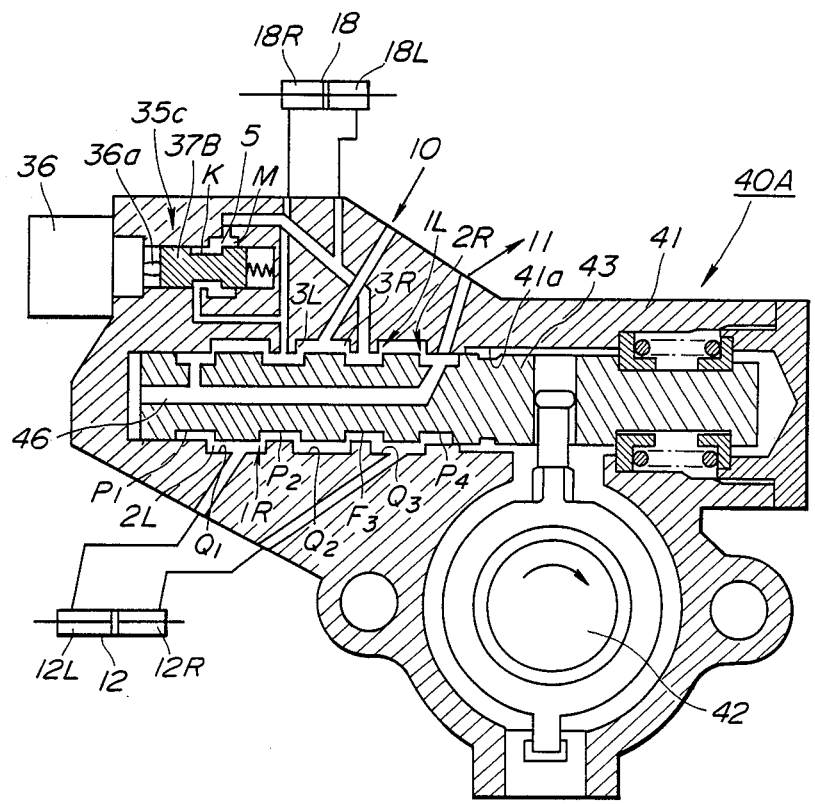
FIG. 19 is a section along the line XIX—XIX in FIG. 18.

The fluid flow distributor circuit 14A shown in FIG. 15 is defined between two relatively displaceable valve elements, namely, a spool 43 and a spool receiving bore 41a formed in a valve housing 41, of a spool type control valve 40A shown in FIGS. 18 and 19. The spool type control valve 40A is substantially the same as the spool type control valve 40 shown in FIGS. 11 and 12 except the construction of the externally controlled variable flow orifice valve 35C. This valve 35C is substantially the same as the externally controlled variable flow orifice valve 35B used in the rotary type control valve 30B shown in FIGS. 16 and 17.

Figure 20:
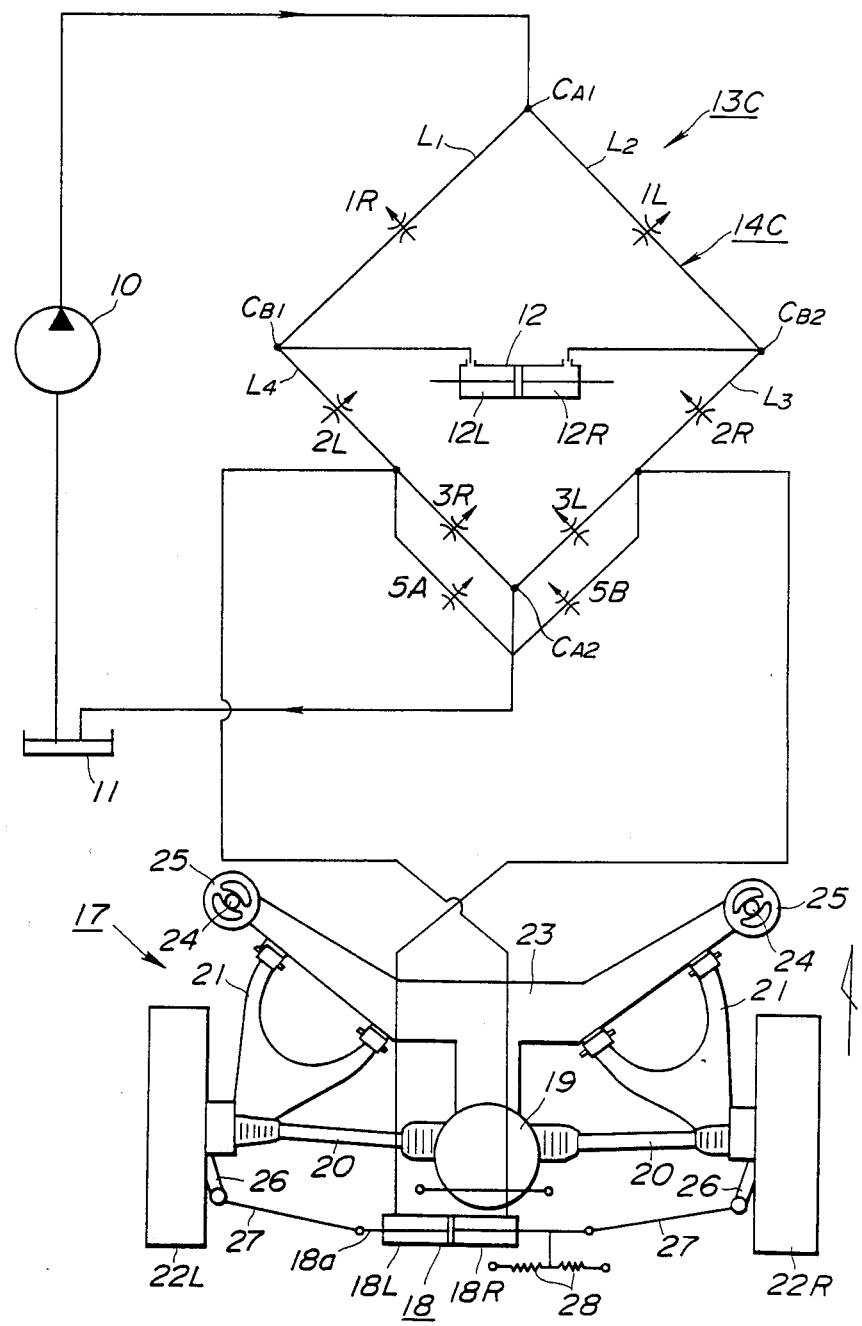
FIGS. 20 to 24 show various embodiments.

Referring to FIG. 20, a further embodiment is described. A control valve 13C shown herein employs a fluid flow distributor circuit 14C. This fluid flow distributor circuit 14C is different from the fluid flow distributor circuit shown in FIG. 1 in that a first auxiliary variable flow orifice of the first kind is arranged in a first fluid flow path $L_1$-$L_4$ at the downstream section $L_4$ and in series with and downstream of an outflow variable flow orifice 2L of the second kind, and a second auxiliary variable flow orifice 3L of the second kind is arranged in a second fluid flow path $L_2$-$L_3$ at the downstream section $L_3$ thereof and in series with and downstream of an outflow control variable orifice 2R of the first kind. Arranged in parallel to these auxiliary variable flow orifices 3R and 3L are externally controlled variable flow orifices 5A and 5B, respectively. Referring also to FIGS. 2, 3, 4 and 5, the flow area A of each of the inflow control orifices 1R, 1L of this circuit 14C varies in response to steering torque T in the second pattern as shown in FIG. 3, and the flow area A of each of the outflow control variable flow orifices 2R, 2L of this circuit 14C varies in response to steering torque T in the first pattern as shown in FIG. 2. The varation patterns of the flow area of the auxiliary variable flow orifices 3R, 3L and that of the externally controlled variable flow orifices 5A, 5B are the same as those of the counterparts shown in FIG. 1.

Let us now consider the case where the steering wheel is turned clockwise at high vehicle speeds when both of the externally controlled variable flow orifices 5A and 5B are fully closed. Under these circumstances, the inflow control variable flow orifice 1R and the outflow control variable flow orifice 2R effect a throttling of the fluid path, inducing a pressure drop which results in a pressure increase in a right turn cylinder chamber 12R of a front power cylinder 12. The auxiliary variable flow orifice 3R effects a throttling, inducing a pressure increase in a left turn cylinder chamber 12L of the front power cylinder and a right turn cylinder chamber 18R of a rear power cylinder 18. A left turn cylinder chamber 18L of the rear power cylinder 18 is in substantially direct connection with a fluid reservoir 11 since the auxiliary variable orifice 3L is open. Therefore, a pressure difference $P_F$ is decreased as compared to the case when the vehicle speed is zero, whereas a pressure difference $P_R$ is increase as compared to the case when the vehicle speed is zero. In turning the steering wheel clockwise at zero vehicle speed, both of the cylinder chambers 18R, 18L of the rear power cylinder 18 are substantially in direct connection with the fluid reservoir 11, and the left turn cylinder chamber 12L is substantially in direct connection with the fluid reservoir 11.

Figure 21:
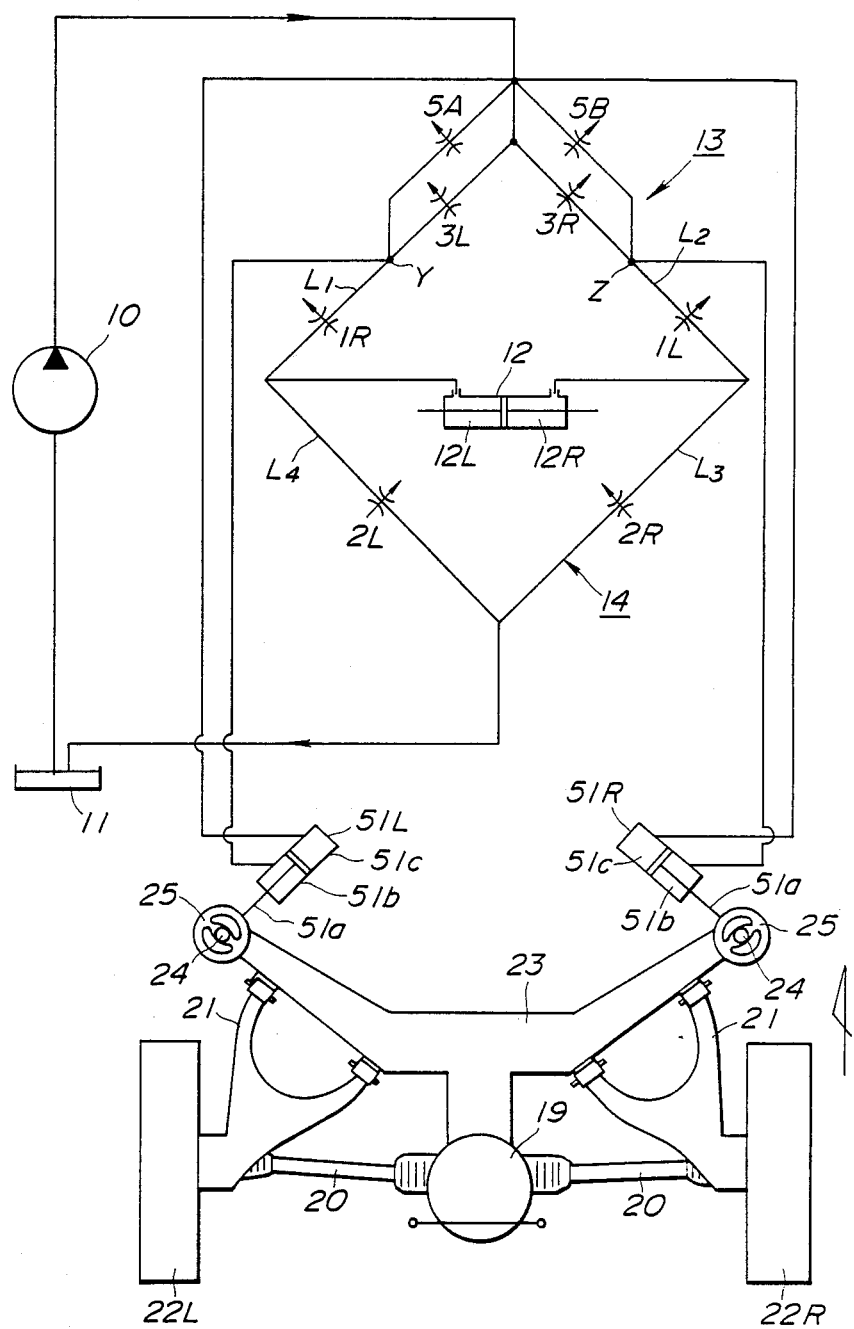

Referring to FIG. 21, this embodiment illustrated herein is different from the first embodiment shown in FIG. 1 in that a pressure difference created across an externally controlled variable flow orifice 5A is applied to a left turn wheel power cylinder 51L, while a pressure difference created across an externally controlled variable flow orifice 5B is applied to a right turn wheel power cylinder 51R. The left turn wheel power cylinder 51L is secured to the vehicle body and has its rod 51a connected to a rubber insulator 25. Cylinder chambers 51b and 51c of the left turn wheel power cylinder 51L are connected to a downstream portion Y and an upstream portion of the externally controlled variable flow orifice 5A. The right turn wheel power cylinder 51R is secured to the vehicle body and has its rod 51a connected to a rubber insulator 25. Cylinder chambers 51b and 51c of the right turn wheel cylinder 51R are connected to downstream portion Z and an upstream portion of the externally controlled variable flow orifice 5B. With this arrangement, a pressure drop or difference created across the auxiliary variable flow orifice 3R is supplied to the right turn wheel cylinder 51R to cause the rear wheels 22L and 22R to turn to the right slightly, whereas a pressure drop or difference created across the auxiliary variable flow orifice 3L is supplied to the left turn wheel cylinder 51L to cause the rear wheels 22L and 22R to turn to the left slightly.

Figure 22:
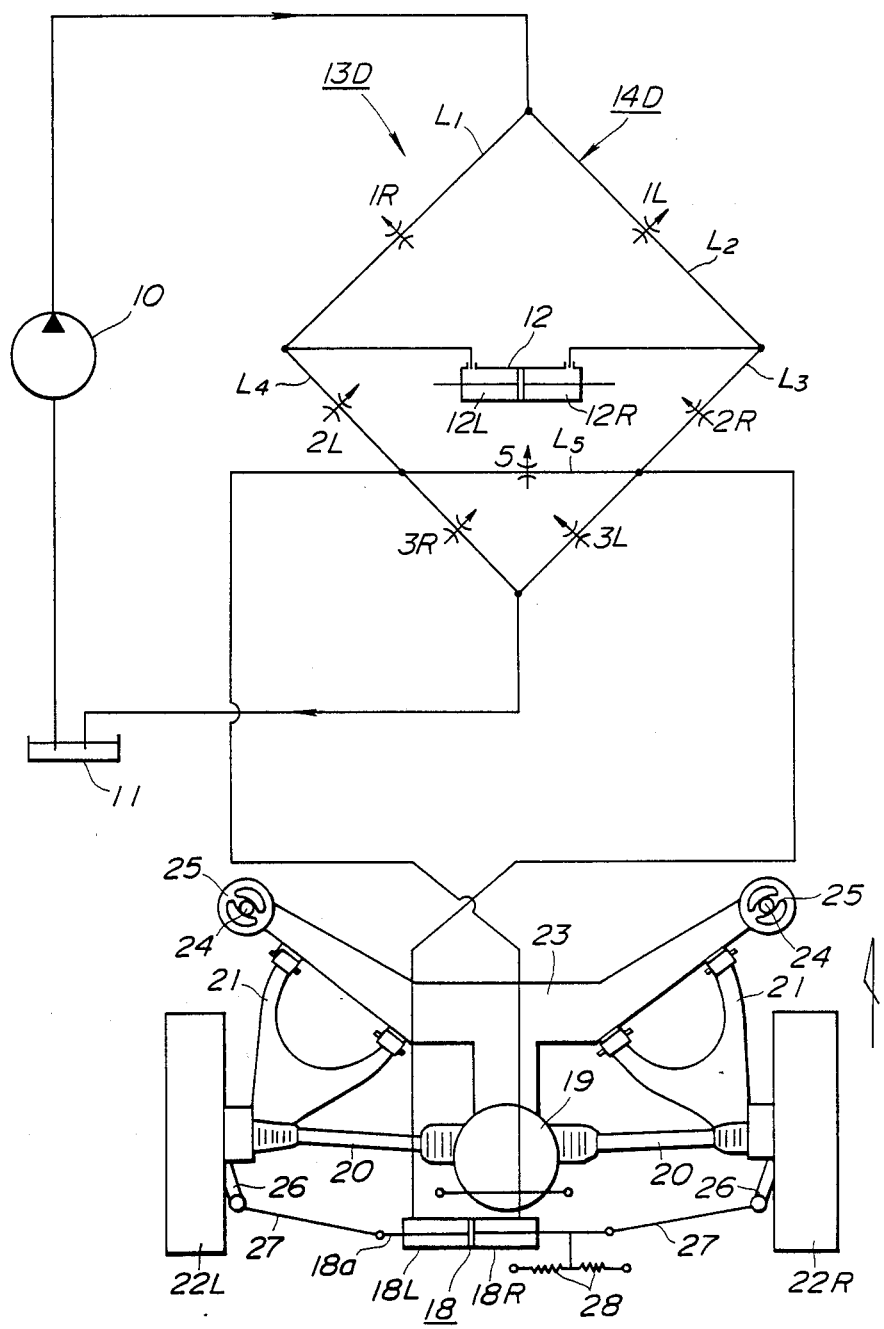

Referring to FIG. 22, a control valve 13D is substantially the same as the control valve 13C shown in FIG. 20 in that a fluid flow distributor circuit 14D employed is identical to the fluid flow distributor circuit 14C shown in FIG. 14C. However, the control valve 13C is different from the control valve 13C in that instead of two externally controlled orifices 5A and 5B, an externally controlled variable flow orifice 5 is employed.

Figure 23:
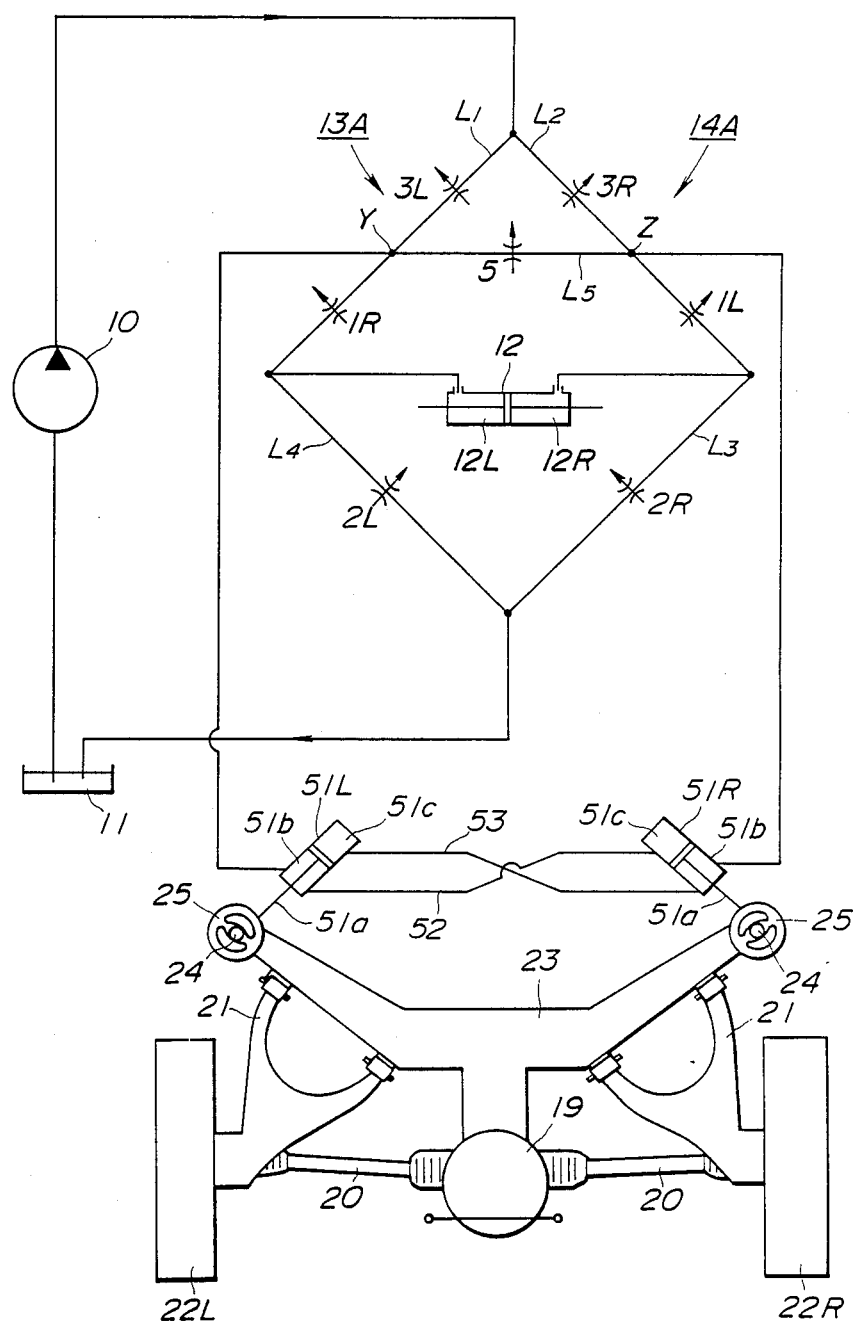

Referring to FIG. 23, this embodiment illustrated herein is different from the embodiment shown in FIG. 15 in that a pressure difference created across an externally controlled variable flow orifice 5 is applied to a left turn wheel power cylinder 51L and a right turn wheel power cylinder 51R in the opposite direction. For this purpose, a cylinder chamber 51b of the left turn wheel power cylinder 15L is connected to a predetermined portion Y and connected via a pipe 52 to a cylinder chamber 51c of the right turn wheel power cylinder 51R. A cylinder chamber 51b of the right turn wheel power cvylinder 51R is connected to a predetermined portion Z and connected via a pipe 53 to a cylinder chamber 51c of the left turn wheel power cylinder 51L.

In the previously described embodiments, the invention has been applied to an invariable power assist steering system. However, the present invention may be applied to conventional variable power assist steering systems.

Figure 24:
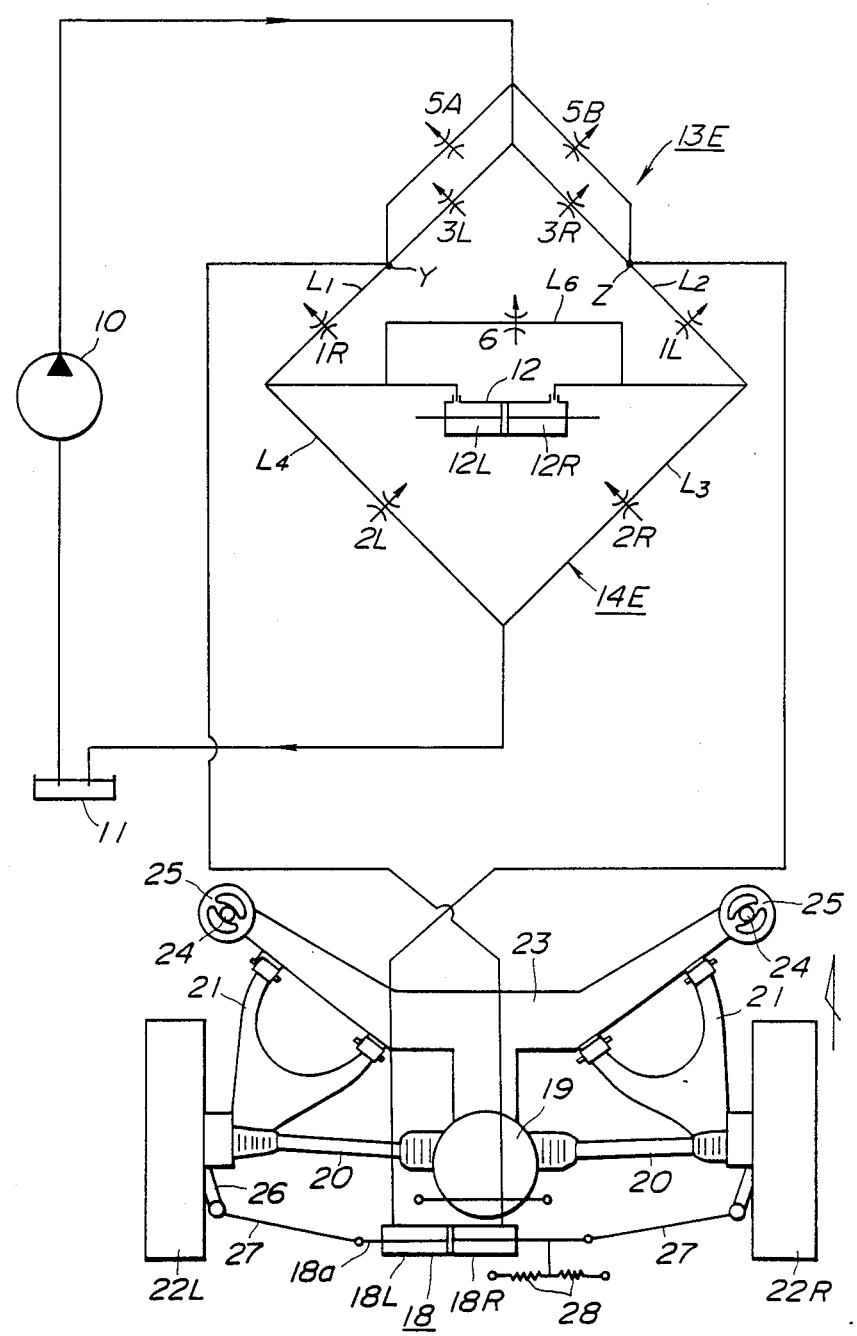
Figure 25:
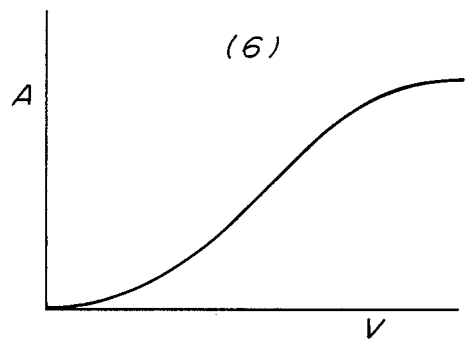
FIG. 25 shows a variation pattern of a flow area of an externally controlled variable flow orifice (6)

FIG. 24 shows one example wherein the invention is applied to a variable power assist power steering control valve 13E wherein the magnitude of a pressure difference $P_F$ created in a front power cylinder 12 is decreased to cause a reduction in power assist as vehicle speed increases. An externally controlled variable flow orifice 6 is disposed in a bypass path $L_6$ bypassing the front power cylinder 12. The flow area of the externally controlled variable flow orifice 6 increases as vehicle speed V increases in a pattern as shown in FIG. 25. Thus, the embodiment illustrated in FIG. 24 is different from the first embodiment shown in FIG. 1 in the provision of the externally controlled variable flow orifice disposed in the bypass path $L_6$.

FIG. 26 shows another example whwere the invention is applied to the variable power assist steering control valve of the same type as explained in connection with FIG. 24. Thus, this embodiment shown in FIG. 26 is different from the embodiment shown in FIG. 15 in the provision of an externally controlled variable flow orifice 6 in a bypass path $L_6$.

Figure 28:
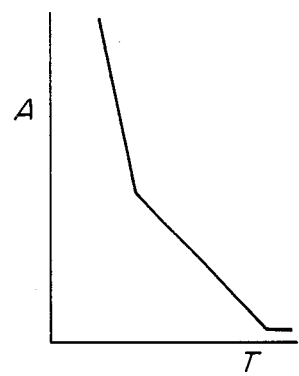
FIGS. 28 and 29 show variation patterns of flow areas of series arranged variable flow orifices used in FIG. 27.
Figure 29:
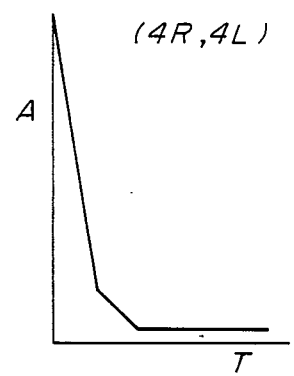
Figure 27:
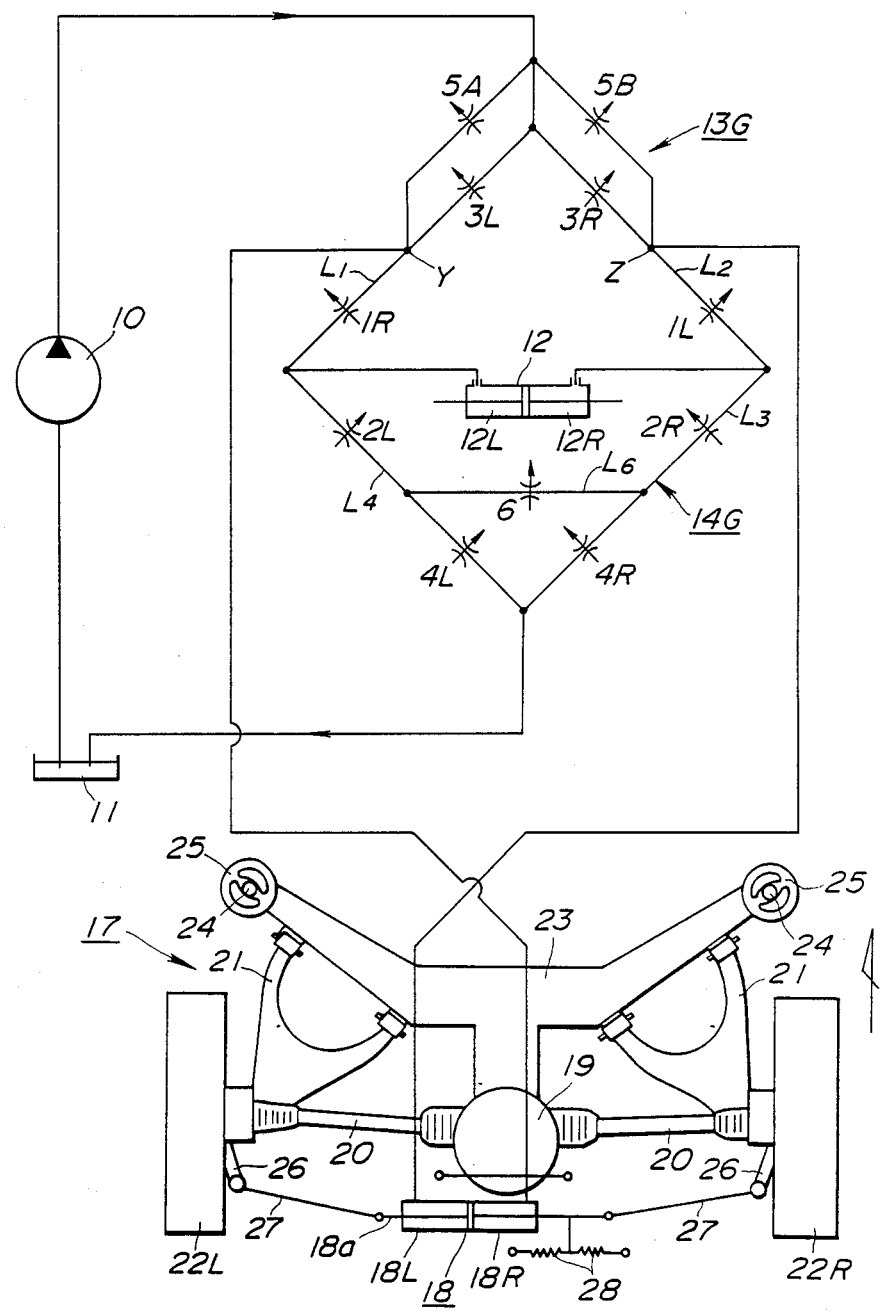

FIG. 27 shows still another example wherein the present invention is applied to another variable power assist steering system. In FIG. 27, disposed in a bypass path $L_6$ is an externally controlled variable flow orifice 6 which has an orifice area variable in response to vehicle speed V in the pattern as illustrated in FIG. 25. The bypass path $L_6$ has one end connected to a downstream section $L_4$ of a first fluid path $L_1$-$L_4$ at a portion between two series outflow variable flow orifices 2L and 4L of the second kind which decrease their flow areas in response to steering torque T during counterclockwise turning of the steering wheel. The opposite end of the bypass path $L_6$ is connected to the downstream section $L_3$ of the second fluid flow path $L_2$-$L_3$ at a portion between two series outflow control variable flow orifices 2R and 4R of the first kind which decrease their flow areas in response to steering torque during clockwise turning of the steering wheel. The flow area of the outflow control variable flow orifice 2L or 2R varies in a pattern as shown in FIG. 28, while the flow area of the outflow control orifice 4L or 4R varies in a pattern as illustrated in FIG. 29. Thus, the embodiment is different from the first embodiment shown in FIG. 1 only in this arrangement just described above.

Figure 30:
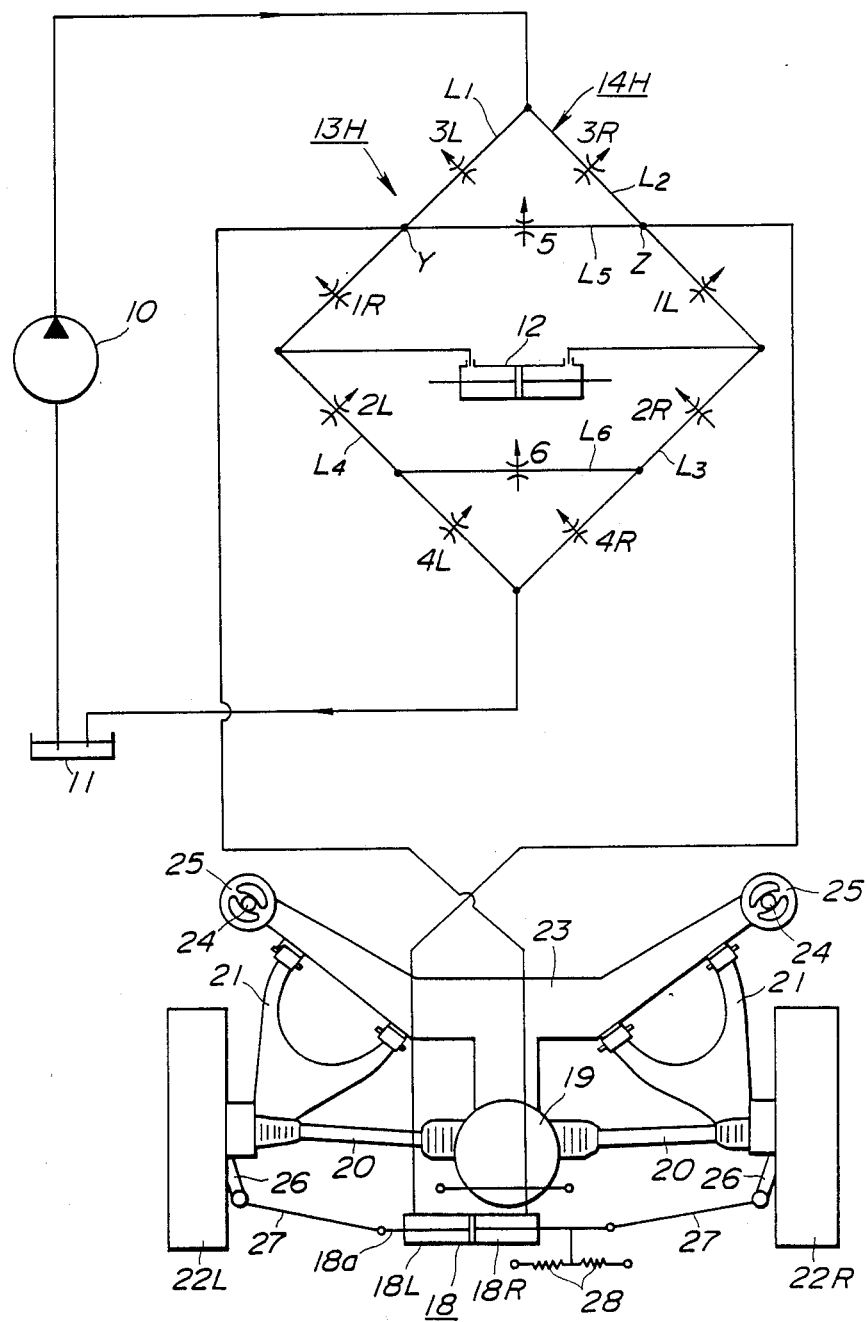
FIG. 30 shows a last embodiment.

FIG. 30 shows an example wherein the present invention is applied to the same variable power assist steering system as described in connection with FIG. 27. Thus, this embodiment illustrated in FIG. 30 is different from the embodiment shown in FIG. 15 in the provision of the variable power assist arrangement just described in connection with FIG. 27.

In the preceeding description, the present invention has been described taking a rear power cylinder 18 or rear power cylinder 51R, 51L as an example of a second hydraulic operated device. However, some other vehicle mounted hydraulically operated device may be hydraulically operated. If desired, a pressure sensor may be used as the second hydraulically operated device to detect state of activation of a power cylinder 12. In this case, a relatively small pressure can be supplied to the sensor so that such a sensor may be made compact.

In the previously described embodiments, externally controlled variable flow orifices 5, 5A, 5B and 6 vary their orifice areas in response to vehicle speed. However, some other variable closely related to the operation of the vehicle may be used, such as a road friction or a driver's preference of the degree of power assistance.

What is claimed is:

1. A hydraulic fluid pressure control system for a vehicle including a steering wheel, a hydraulic fluid source, a fluid reservoir, a hydraulic pressure operated power cylinder, as a first hydraulic fluid pressure operated device, adapted to be connected to a steering linkage, and a second hydraulic fluid pressure operated device, comprising:
   a control valve including valve elements relatively displaceable in response to a first predetermined variable to define therebetween parallel first and second fluid flow paths, connected between the fluid source and the fluid reservoir to produce a first pressure difference in the power cylinder in response to said first predetermined variable, wherein
   said valve elements define therebetween variable flow orifice means disposed in said parallel first and second fluid flow paths for producing a second pressure difference in the second hydraulic fluid pressure operated device in response to said first predetermined variable;
   said control valve also includes an externally controlled variable flow orifice valve arranged with respect to said variable flow orifice means such that said externally controlled variable flow orifice valve increases fluid flow passing therethrough in response to a second predetermined variable to decrease said second pressure difference in the second hydraulic fluid pressure operated device.

2. A hydraulic fluid pressure control system as claimed in claim 1, wherein
said first fluid flow path includes an inflow control variable flow orifice of the first kind which has an orifice area decreasing as the valve elements relatively displace in one direction from a central rest position so as to restrict fluid flow into the power cylinder, and an outflow control variable flow orifice of the second kind which has an orifice area decreasing as the valve elements relatively displace in the opposite direction from the central rest position so as to restrict fluid flow out of the power cylinder;
said second fluid flow path includes an inflow control variable flow orifice of the second kind which has an orifice area decreasing as the valve elements relatively displace in the opposite direction from the central rest position so as to restrict fluid flow into said the power cylinder, and an outflow control variable flow orifice of the first kind which has an orifice area decreasing as the valve elements relatively displace in the one direction from the central rest position so as to restrict fluid flow out of the power cylinder.

3. A hydraulic fluid pressure control system as claimed in claim 2, wherein said variable flow orifice means include an auxiliary variable flow orifice arranged in said at least one of said first and second fluid flow paths as to restrict fluid flow into the power cylinder.

4. A hydraulic fluid pressure control system as claimed in claim 2, wherein said variable flow orifice means include an auxiliary variable flow orifice arranged in said at least one of said first and second fluid flow paths as to restrict fluid flow out of the power cylinder.

5. A hydraulic fluid pressure control system as claimed in claim 2, wherein
said variable flow orifice means include a first auxiliary variable flow orifice of the first kind which has an orifice area decreasing as the valve elements relatively displace in said one direction from the central rest position, and a second auxiliary variable flow orifice of the second kind which has an orifice area decreasing as the valve elements relatively displace in said opposite direction from the central rest position, and wherein
said first auxiliary variable flow orifice of the first kind is arranged in said second fluid flow path in series with said inflow control variable flow orifice of the second kind therein so as to restrict fluid flow into the power cylinder, and said second auxiliary variable flow orifice of the second kind is arranged in said first fluid flow path in series with said inflow control variable flow orifice of the first kind so as to restrict fluid flow into the power cylinder.

6. A hydraulic fluid pressure control system as claimed in claim 5, wherein said externally controlled variable flow orifice valve defines a first externally controlled variable flow orifice arranged in parallel to said second auxiliary variable flow orifice of the second kind and a second externally controlled variable flow orifice arranged in parallel to said first auxiliary variable flow orifice of the first kind.

7. A hydraulic fluid pressure control system as claimed in claim 6, wherein said first auxiliary variable flow orifice is disposed upstream of said inflow control variable flow orifice of the second kind, and said second auxiliary variable flow orifice is disposed upstream of said inflow control variable flow of the first kind.

8. A hydraulic fluid pressure control system as claimed in claim 7, wherein said first fluid flow path includes a first predetermined portion connected to the second hydraulic fluid pressure operated device, said first predetermined portion being disposed downstream of said second auxiliary variable flow orifice and said first externally controlled variable flow orifice and upstream of said inflow control variable flow orifice of the first kind, and said second fluid flow path includes a second predetermined portion connected to the second hydraulic fluid pressure operated device, said second predetermined portion being disposed downstream of said first auxiliary variable flow orifice and said second externally controlled variable flow orifice and upstream of said inflow control variable flow orifice of the second kind.

9. A hydraulic fluid pressure control system as claimed in any one of claim 1, wherein said second predetermined variable is vehicle speed of the vehicle, and said externally controlled variable flow orifice valve varies fluid flow bypassing said flow orifice means in inverse proportion to the vehicle speed, thus, with the same first predetermined variable, varying said second pressure difference in the second hydraulic fluid pressure operated device in proportion to the vehicle speed, whereby said externally controlled variable flow orifice decreases said second pressure difference as the vehicle speed decreases to minimize effect of said variable flow orifice means on said first pressure difference in the power cylinder.

10. A hydraulic fluid pressure control system as claimed in claim 5, wherein said first auxiliary variable flow orifice is disposed upstream of said inflow control variable flow orifice of the second kind, and said second auxiliary variable flow orifice is disposed upstream of said inflow control variable flow orifice of the first kind.

11. A hydraulic fluid pressure control system as claimed in claim 10, wherein said externally controlled variable flow orifice valve defines an externally controlled variable flow orifice having one end connected to said first fluid flow path at a first predetermined portion thereof disposed between said second auxiliary variable flow orifice and said inflow control variable flow orifice of the first kind and an opposite end connected to said second fluid flow path at a second predetermined portion thereof disposed between said first auxiliary variable flow orifice and said inflow control variable flow orifice of the second kind.

12. A hydraulic fluid pressure control system as claimed in claim 11, wherein said first predetermined portion of said first fluid flow path and said second predetermined portion of said second fluid flow path are connected to said second hydraulic fluid pressure operated device.

13. A hydraulic fluid pressure control system as claimed in any one of claim 1, wherein said second predetermined variable is vehicle speed of the vehicle, and said externally controlled variable flow orifice valve varies fluid flow bypassing said flow orifice means in inverse proportion to the vehicle speed, thus, with the same first predetermined variable, varying said second pressure difference in the second hydraulic fluid pressure operated device in proportion to the vehicle speed, whereby said externally controlled variable flow orifice decreases said second pressure difference as the vehicle speed decreases to minimize effect of said variable flow orifice means on said first pressure difference in the power cylinder.

14. A hydraulic fluid pressure control system as claimed in claim 2, wherein said variable flow orifice means include a first auxiliary variable flow orifice of the first kind which has an orifice area decreasing as the valve elements relatively displace in said one direction from the central rest position, and a second auxiliary variable flow orifice of the second kind which has an orifice area decreasing as the valve elements relatively displace in said opposite direction from the central rest position, and wherein said first auxiliary variable flow orifice of the first kind is arranged in said first fluid flow path in series with said outflow control variable flow orifice of the second kind therein so as to restrict fluid flow out of the power cylinder, and said second auxiliary variable flow orifice of the second kind is arranged in said second fluid flow path in series with said outflow control variable flow orifice of the first kind so as to restrict fluid flow out of the power cylinder.

15. A hydraulic fluid pressure control system as claimed in claim 14, wherein said externally controlled variable flow orifice valve defines a first externally controlled variable flow orifice arranged in parallel to said second auxiliary variable flow orifice of the second kind and a second externally controlled variable flow orifice arranged in parallel to said first auxiliary variable flow orifice of the first kind.

16. A hydraulic fluid pressure control system as claimed in claim 15, wherein said first auxiliary variable flow orifice is disposed downstream of said outflow control variable flow orifice of the second kind, and said second auxiliary variable flow orifice is disposed downstream of said outflow control variable flow of the first kind.

17. A hydraulic fluid pressure control system as claimed in claim 16, wherein said first fluid flow path includes a first predetermined portion connected to the second hydraulic fluid pressure operated device, said first predetermined portion being disposed upstream of said first auxiliary variable flow orifice and said second externally controlled variable flow orifice and downstream of said outflow control variable flow orifice of the second kind, and said second fluid flow path includes a second predetermined portion connected to the second hydraulic fluid pressure operated device, said second predetermined portion being disposed upstream of said second auxiliary variable flow orifice and said first externally controlled variable flow orifice and downstream of said outflow control variable flow orifice of the first kind.

18. A hydraulic fluid pressure control system as claimed in claim 1, wherein said second predetermined variable is vehicle speed of the vehicle, and said externally controlled variable flow orifice valve varies fluid flow bypassing said flow orifice means in inverse proportion to the vehicle speed, thus, with the same first predetermined variable, varying said second pressure difference in the second hydraulic fluid pressure operated device in proportion to the vehicle speed, whereby said externally controlled variable flow orifice decreases said second pressure difference as the vehicle speed decreases to minimize effect of said variable flow orifice means on said first pressure difference in the power cylinder.

19. A hydraulic fluid pressure control system as claimed in claim 5, wherein said first auxiliary variable flow orifice is disposed downstream of said outflow control variable flow orifice of the second kind, and said second auxiliary variable flow orifice is disposed downstream of said outflow control variable flow orifice of the first kind.

20. A hydraulic fluid pressure control system as claimed in claim 19, wherein said externally controlled variable flow orifice valve defines an externally controlled variable flow orifice having one end connected to said first fluid flow path at a first predetermined portion thereof disposed between said first auxiliary variable flow orifice and said outflow control variable flow orifice of the second kind and an opposite end connected to said second fluid flow path at a second predetermined portion thereof disposed between said second auxiliary variable flow orifice and said outflow control variable flow orifice of the first kind.

21. A hydraulic fluid pressure control system as claimed in claim 11, wherein said first predetermined portion of said first fluid flow path and said second predetermined portion of said second fluid flow path are connected to said second hydraulic fluid pressure operated device.

* * * * *